US009372857B2

(12) United States Patent
Homma et al.

(10) Patent No.: US 9,372,857 B2
(45) Date of Patent: Jun. 21, 2016

(54) INFORMATION PROCESSING APPARATUS, TRAIL COLLECTION SYSTEM, INFORMATION PROCESSING METHOD, AND NON-TRANSITORY COMPUTER READABLE MEDIUM

(71) Applicant: FUJI XEROX CO., LTD., Minato-ku, Tokyo (JP)

(72) Inventors: Ryusuke Homma, Kanagawa (JP); Toshihide Yoshimura, Kanagawa (JP); Hiroshi Takagi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 298 days.

(21) Appl. No.: 13/789,052

(22) Filed: Mar. 7, 2013

(65) Prior Publication Data
US 2014/0067753 A1 Mar. 6, 2014

(30) Foreign Application Priority Data

Sep. 4, 2012 (JP) ................................. 2012-193931

(51) Int. Cl.
G06F 17/30 (2006.01)
G06Q 30/02 (2012.01)
G06Q 30/06 (2012.01)
G06Q 30/04 (2012.01)

(52) U.S. Cl.
CPC .......... *G06F 17/30011* (2013.01); *G06Q 30/02* (2013.01); *G06Q 30/04* (2013.01); *G06Q 30/0633* (2013.01)

(58) Field of Classification Search
CPC G06F 17/30011; G06F 21/30; G06F 2221/21
USPC ................................................ 707/707, 608
See application file for complete search history.

(56) References Cited

U.S. PATENT DOCUMENTS

| 8,855,425 | B2 * | 10/2014 | Schmidtler | ........ G06K 9/00469 382/182 |
| 2005/0049974 | A1 * | 3/2005 | Jani | ........................ G06Q 20/02 705/64 |
| 2005/0075932 | A1 * | 4/2005 | Mankoff | ......................... 705/14 |
| 2007/0162402 | A1 * | 7/2007 | Hoij | ........................ G06Q 20/02 705/75 |
| 2008/0231909 | A1 * | 9/2008 | Nakamura et al. | ............. 358/403 |
| 2008/0313186 | A1 * | 12/2008 | Marsh | ................ G06F 17/30011 |
| 2009/0125350 | A1 * | 5/2009 | Lessing | .................. G06Q 10/08 705/7.12 |

(Continued)

FOREIGN PATENT DOCUMENTS

| JP | 2005-063339 A | 3/2005 |
| JP | 2008-234592 A | 10/2008 |
| JP | 2010-079703 A | 4/2010 |

*Primary Examiner* — Debbie Le
(74) *Attorney, Agent, or Firm* — Sughrue Mion, PLLC

(57) ABSTRACT

An information processing apparatus includes a sample extracting unit, a trail information memory, a trail acquisition instructing unit, a trail accepting unit, and a trail determining unit. The sample extracting unit extracts samples from a population. The trail information memory stores information about trails. The trail acquisition instructing unit provides an instruction to acquire a trail for a sample extracted by the sample extracting unit. The trail accepting unit accepts trails. The trail determining unit determines, every time the trail accepting unit accepts a trail, whether the accepted trail is valid or invalid in accordance with the information stored in the trail information memory. If the trail determining unit determines that the accepted trail is invalid, the trail acquisition instructing unit provides again an instruction to acquire a trail.

16 Claims, 27 Drawing Sheets

(56) References Cited

U.S. PATENT DOCUMENTS

| | | | |
|---|---|---|---|
| 2011/0320358 A1* | 12/2011 | Harris et al. ............... 705/45 |
| 2013/0088757 A1* | 4/2013 | Schmidtler ........ G06K 9/00469 |
| | | 358/462 |
| 2013/0091002 A1* | 4/2013 | Christie et al. ............. 705/14.26 |
| 2014/0067557 A1* | 3/2014 | van Niekerk et al. ...... 705/14.73 |
| 2014/0079294 A1* | 3/2014 | Amtrup ............. G06K 9/00469 |
| | | 382/112 |
| 2014/0095276 A1* | 4/2014 | Sutcliffe ...................... 705/14.1 |
| 2014/0153787 A1* | 6/2014 | Schmidtler ........ G06K 9/00469 |
| | | 382/112 |

* cited by examiner

FIG. 4

| TRANSACTION ID | INPUT DATE | PRICE (¥) | USER WHO INPUT DATA | ... | INVOICE No. | RECEIPT No. |
|---|---|---|---|---|---|---|
| 1 | 4/1/2011 | 500,000 | User001 | ... | 20110401-1 | 318131 |
| 2 | 4/1/2011 | 120,000 | User123 | ... | 20110401-2 | 249813 |
| : | : | : | : | : | : | : |
| 9999 | 6/30/2011 | 1,100,000 | User999 | ... | 20110630-18 | 984231 |
| : | : | : | : | : | : | : |

FIG. 5

| SAMPLE No. | TRANSACTION ID | INPUT DATE | PRICE (¥) | USER WHO INPUT DATA | ... | INVOICE No. | RECEIPT No. |
|---|---|---|---|---|---|---|---|
| 1 | 100 | 4/5/2011 | 500,000 | User001 | ... | 20110405-3 | 318131 |
| 2 | 5013 | 5/31/2011 | 120,000 | User123 | ... | 20110531-12 | 249813 |
| 3 | 8024 | 6/20/2011 | 800,000 | User234 | ... | 20110620-2 | 158431 |
| 4 | 2038 | 4/13/2011 | 1,100,000 | User999 | ... | 20110413-8 | 984231 |
| 5 | 694 | 4/7/2011 | 134,000 | User587 | ... | 20110407-5 | 898465 |

FIG. 6

| TRAIL ID | SPECIFICATION INFORMATION | TEMPLATE IMAGE | VERIFICATION REGION | VERIFICATION CONDITION |
|---|---|---|---|---|
| 1111 | TRANSACTION ID | (BINARY DATA) | 1A: (100, 100), (300, 200)<br>1B: (100, 300), (500, 150) | · 1A > 500<br>· 1B = 2A |
| 2222 | INVOICE No. | (BINARY DATA) | 2A: (100, 100), (300, 200) | · 2A = 1B |
| : | : | : | : | : |

FIG. 7

| SAMPLE No. | TRAIL ID | TRAIL NAME | TRAIL SPECIFICATION INFORMATION | PERSON IN CHARGE | STATUS |
|---|---|---|---|---|---|
| 1 | 1111 | ESTIMATION SHEET | TRANSACTION ID = 100 | UserAAA | COLLECTING |
| 1 | 2222 | INVOICE | INVOICE No. = 20110405-3 | UserBBB | COLLECTING |
| 1 | 3333 | RECEIPT | RECEIPT No. = 318131 | UserAAA | COLLECTING |
| 2 | 1111 | ESTIMATION SHEET | TRANSACTION ID = 5013 | UserCCC | NOT YET REQUESTED |
| : | : | : | : | : | : |

FIG. 8

| SAMPLE No. | TRAIL ID | IMAGE DATA |
|---|---|---|
| 1 | 1111 | (BINARY DATA) |
| 1 | 2222 | (BINARY DATA) |
| : | : | : |

FIG. 9

| SAMPLE No. | RESULT |
|---|---|
| 1 | VALID |
| 2 | INVALID |
| 3 | INVALID |
| 4 | |
| : | : |

FIG. 12

| SAMPLE No. | TRAIL ID | TRAIL NAME | TRAIL SPECIFICATION INFORMATION |
|---|---|---|---|
| 1 | 1111 | ESTIMATION SHEET | TRANSACTION ID = 100 |
| 2 | 1111 | ESTIMATION SHEET | TRANSACTION ID = 5013 |
| 3 | 1111 | ESTIMATION SHEET | TRANSACTION ID = 8024 |
| ⋮ | ⋮ | ⋮ | ⋮ |
| 25 | 1111 | ESTIMATION SHEET | TRANSACTION ID = 694 |

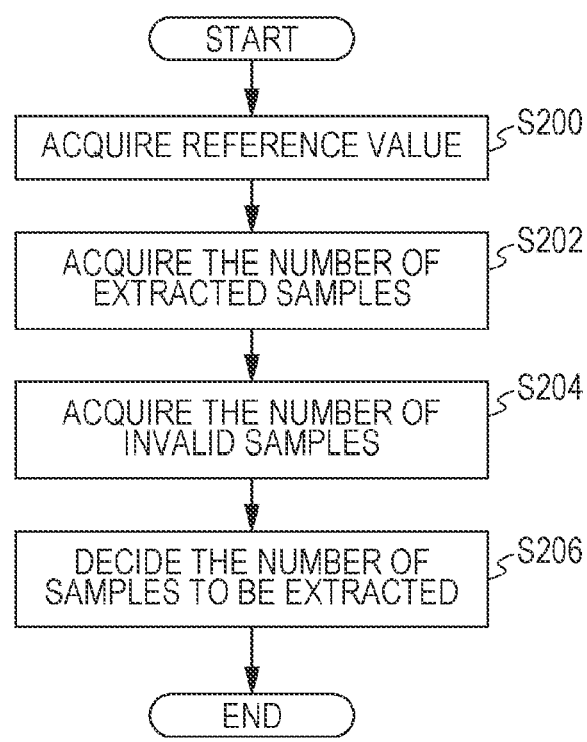

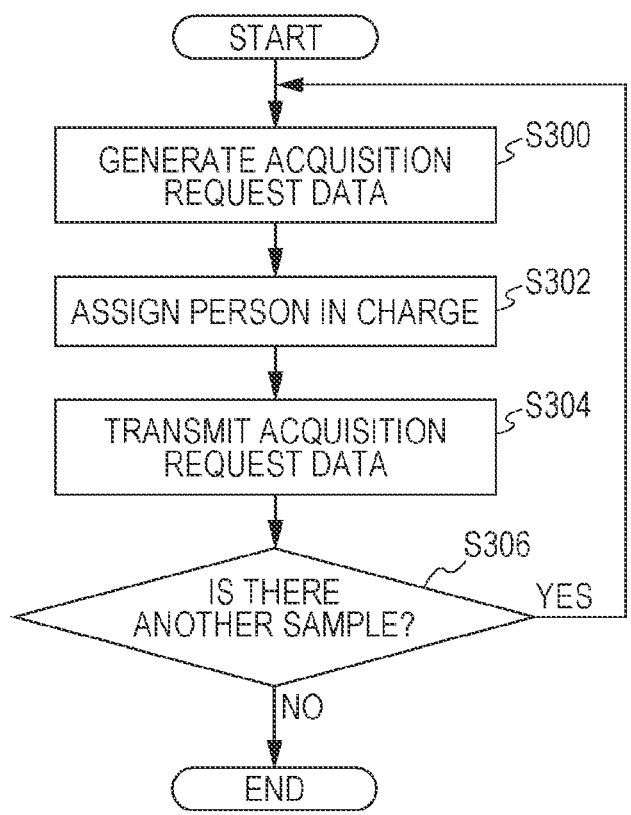

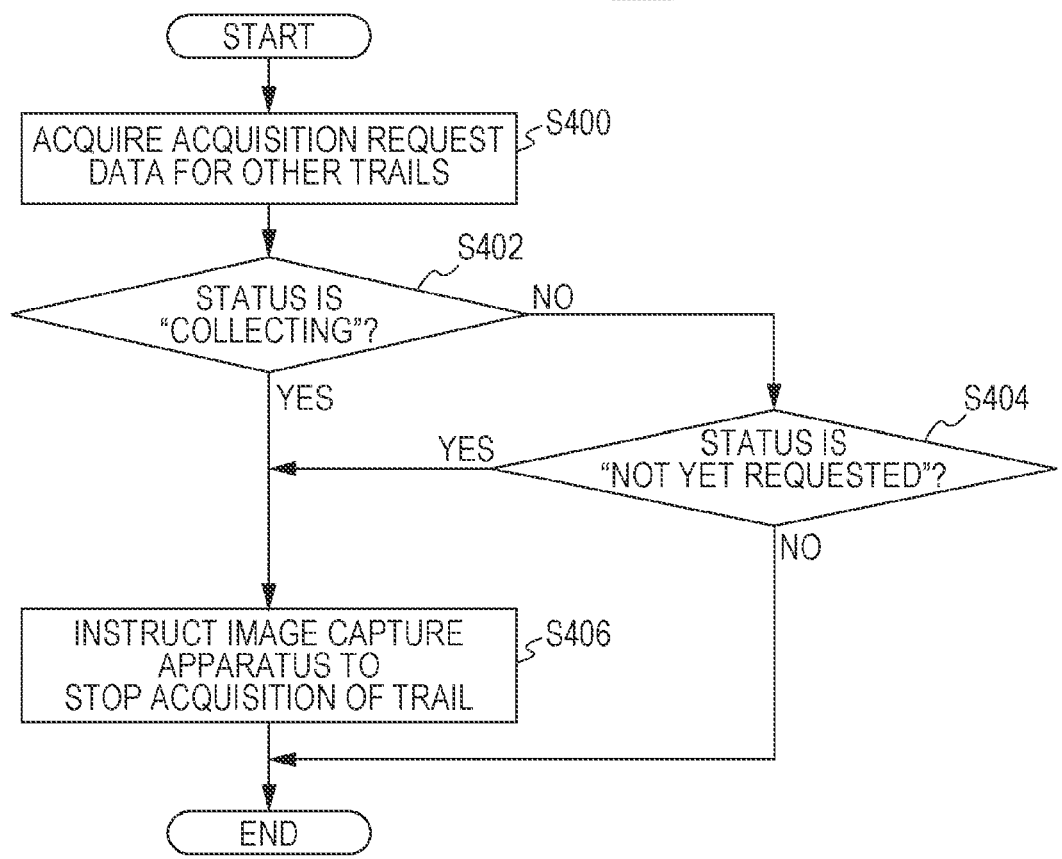

FIG. 17A

| TRANSACTION ID | INPUT DATE | PRICE (¥) | USER WHO INPUT DATA | ... | INVOICE No. | RECEIPT No. |
|---|---|---|---|---|---|---|
| 1 | 4/1/2011 | 500,000 | User001 | ... | 20110401-1 | 318131 |
| 2 | 4/1/2011 | 120,000 | User123 | ... | 20110401-2 | 249813 |
| : | : | : | : | : | : | : |
| 9999 | 6/30/2011 | 1,100,000 | User999 | ... | 20110630-18 | 984231 |
| : | : | : | : | : | : | : |

FIG. 17B

| TRAIL ID | SPECIFICATION INFORMATION | TEMPLATE IMAGE | VERIFICATION REGION | VERIFICATION CONDITION |
|---|---|---|---|---|
| 1111 | TRANSACTION ID | (BINARY DATA) | 1A: (100, 200), (400, 300)<br>1B: (100, 400), (300, 500) | · 1A ≥ 4/1/2010 AND 1A ≤ 3/31/2011<br>· 1B = 2A |
| 2222 | INVOICE No. | (BINARY DATA) | 2A: (100, 100), (200, 200) | 2A = 1B |
| 3333 | RECEIPT No. | (BINARY DATA) | : | : |

| SAMPLE No. | TRANSACTION ID | INPUT DATE | PRICE (¥) | USER WHO INPUT DATA | ... | INVOICE No. | RECEIPT No. |
|---|---|---|---|---|---|---|---|
| 1 | 100 | 4/5/2011 | 500,000 | User001 | ... | 20110405-3 | 318131 |
| 2 | 5013 | 5/31/2011 | 120,000 | User123 | ... | 20110531-12 | 249813 |
| 3 | 8024 | 6/20/2011 | 800,000 | User234 | ... | 20110620-2 | 158431 |
| : | : | : | : | : | : | : | : |
| 25 | 694 | 4/7/2011 | 134,000 | User587 | ... | 20110407-5 | 898465 |

FIG. 20

| SAMPLE No | TRAIL ID | TRAIL NAME | PERSON IN CHARGE | TRAIL SPECIFICATION INFORMATION | STATUS |
|---|---|---|---|---|---|
| 1 | 1111 | ESTIMATION SHEET | | TRANSACTION ID=100 | NOT YET REQUESTED |
| 1 | 2222 | INVOICE | | INVOICE No.=20110405-3 | NOT YET REQUESTED |
| 1 | 3333 | RECEIPT | | RECEIPT No.=318131 | NOT YET REQUESTED |
| 2 | 1111 | ESTIMATION SHEET | | TRANSACTION ID=5013 | NOT YET REQUESTED |
| : | : | : | | : | : |
| 25 | | RECEIPT | | RECEIPT No.=898465 | NOT YET REQUESTED |

FIG. 21

| TRAIL ID | PERSON IN CHARGE |
|---|---|
| 1111 | UserAAA |
| 2222 | UserBBB |
| 3333 | UserAAA |

FIG. 22

| SAMPLE No. | TRAIL ID | TRAIL NAME | PERSON IN CHARGE | TRAIL SPECIFICATION INFORMATION | STATUS |
|---|---|---|---|---|---|
| 1 | 1111 | ESTIMATION SHEET | UserAAA | TRANSACTION ID = 100 | COLLECTING |
| 1 | 2222 | INVOICE | UserBBB | INVOICE No. = 20110405-3 | COLLECTING |
| 1 | 3333 | RECEIPT | UserCCC | RECEIPT No. = 318131 | COLLECTING |
| 2 | 1111 | ESTIMATION SHEET | UserAAA | TRANSACTION ID = 5013 | COLLECTING |
| : | : | : | : | : | : |
| 25 | 3333 | RECEIPT | UserCCC | RECEIPT No. = 898465 | COLLECTING |

FIG. 24

| SAMPLE No. | TRAIL ID | IMAGE DATA |
|---|---|---|
| 1 | 1111 | (BINARY DATA) |

FIG. 25

| SAMPLE No. | TRAIL ID | TRAIL NAME | PERSON IN CHARGE | TRAIL SPECIFICATION INFORMATION | STATUS |
|---|---|---|---|---|---|
| 1 | 1111 | ESTIMATION SHEET | UserAAA | TRANSACTION ID = 100 | COLLECTED |
| 1 | 2222 | INVOICE | UserBBB | INVOICE No. = 20110405-3 | COLLECTING |
| 1 | 3333 | RECEIPT | UserCCC | RECEIPT No. = 318131 | COLLECTING |
| 2 | 1111 | ESTIMATION SHEET | UserAAA | TRANSACTION ID = 5013 | COLLECTING |
| ⋯ | ⋯ | ⋯ | ⋯ | ⋯ | ⋯ |
| 25 | 3333 | RECEIPT | UserCCC | RECEIPT No. = 898465 | COLLECTING |

FIG. 26A

ESTIMATION SHEET

To: XXX

Date: February 1, 2011

| Details | Unit price | Quantity | Amount |
|---------|-----------|----------|--------|
| XXXX    | 450       | 10       | 4500   |
|         |           |          |        |
|         |           |          |        |
|         |           |          |        |
| Total   |           |          | ¥4,500 |

XXX Co., Ltd.
Person in charge: ZZZ 110
112

FIG. 26B

ESTIMATION SHEET

To: XXX

Date: February 1, 2011

| Details | Unit price | Quantity | Amount |
|---------|-----------|----------|--------|
| XXXX    | 450       | 10       | 4500   |
|         |           |          |        |
|         |           |          |        |
|         |           |          |        |
| Total   |           |          | ¥4,500 |

XXX Co., Ltd.
Person in charge: ZZZ 114
114

FIG. 27

| SAMPLE No. | TRAIL ID | IMAGE DATA |
|---|---|---|
| 1 | 1111 | (BINARY DATA) |
| 1 | 2222 | (BINARY DATA) |

FIG. 28

| SAMPLE No. | TRAIL ID | TRAIL NAME | PERSON IN CHARGE | TRAIL SPECIFICATION INFORMATION | STATUS |
|---|---|---|---|---|---|
| 1 | 1111 | ESTIMATION SHEET | UserAAA | TRANSACTION ID = 100 | COLLECTED |
| 1 | 2222 | INVOICE | UserBBB | INVOICE No. = 20110405-3 | COLLECTED |
| 1 | 3333 | RECEIPT | UserCCC | RECEIPT No. = 318131 | COLLECTING |
| 2 | 1111 | ESTIMATION SHEET | UserAAA | TRANSACTION ID = 5013 | COLLECTING |
| : | : | : | : | : | : |
| 25 | 3333 | RECEIPT | UserCCC | RECEIPT No. = 898465 | COLLECTING |

FIG. 29

| SAMPLE No. | RESULT |
|---|---|
| 1 | INVALID |
| 2 | |
| 3 | |
| 4 | |
| .. | .. |

FIG. 30

| SAMPLE No. | TRAIL ID | TRAIL NAME | PERSON IN CHARGE | TRAIL SPECIFICATION INFORMATION | STATUS |
|---|---|---|---|---|---|
| 1 | 1111 | ESTIMATION SHEET | UserAAA | TRANSACTION ID = 100 | COLLECTED |
| 1 | 2222 | INVOICE | UserBBB | INVOICE No. = 20110405-3 | COLLECTED |
| 1 | 3333 | RECEIPT | UserCCC | RECEIPT No. = 318131 | CANCELLED |
| 2 | 1111 | ESTIMATION SHEET | UserAAA | TRANSACTION ID = 5013 | COLLECTING |
| .. | .. | .. | .. | .. | .. |
| 25 | 3333 | RECEIPT | UserCCC | RECEIPT No. = 898465 | COLLECTING |

FIG. 32

| TRAIL ID | SPECIFICATION INFORMATION | SPECIFICATION INFORMATION REGION | TEMPLATE IMAGE | VERIFICATION REGION | VERIFICATION CONDITION |
|---|---|---|---|---|---|
| 1111 | TRANSACTION ID | 1A: (100, 200), (400, 300) | (BINARY DATA) | 1A: (100, 100), (300, 200) <br> 1B: (100, 300), (500, 150) | · 1A > 500 <br> · 1B = 2A |
| 2222 | INVOICE No. | 2A: (100, 100), (200, 200) | (BINARY DATA) | 2A: (100, 100), (300, 200) | · 2A = 1B |
| 3333 | RECEIPT No. | 3A: (1100, 1300), (1500, 1400) | (BINARY DATA) | : | : |

INFORMATION PROCESSING APPARATUS, TRAIL COLLECTION SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-193931 filed Sep. 4, 2012.

BACKGROUND

Technical Field

The present invention relates to an information processing apparatus, a trail collection system, an information processing method, and a non-transitory computer readable medium.

SUMMARY

According to an aspect of the invention, there is provided an information processing apparatus including a sample extracting unit, a trail information memory, a trail acquisition instructing unit, a trail accepting unit, and a trail determining unit. The sample extracting unit extracts samples from a population. The trail information memory stores information about trails. The trail acquisition instructing unit provides an instruction to acquire a trail for a sample extracted by the sample extracting unit. The trail accepting unit accepts trails. The trail determining unit determines, every time the trail accepting unit accepts a trail, whether the accepted trail is valid or invalid in accordance with the information stored in the trail information memory. If the trail determining unit determines that the accepted trail is invalid, the trail acquisition instructing unit provides again an instruction to acquire a trail.

BRIEF DESCRIPTION OF THE DRAWINGS

Exemplary embodiments of the present invention will be described in detail based on the following figures, wherein:

FIG. 4 is a table showing an example of population data stored in a population data storage unit;

FIG. 5 is a table showing an example of sample data stored in a sample data storage unit;

FIG. 6 is a table showing an example of information about trails, stored in a trail information storage unit;

FIG. 7 is a table showing an example of acquisition request data stored in an acquisition request storage unit;

FIG. 8 is a table showing an example of trails stored in a trail storage unit;

FIG. 9 is a table showing an example of information about determination results stored in a determination result storage unit;

FIG. 12 is a table showing an example of acquisition request data stored in an acquisition request storage unit;

FIG. 14 is a flowchart illustrating an example of an operation of deciding the number of samples;

FIG. 15 is a flowchart illustrating an example of an operation of providing an instruction to acquire trails;

FIG. 16 is a flowchart illustrating an example of an operation of providing an acquisition stop instruction;

FIG. 17A is a table showing an example of the population data storage unit;

FIG. 17B is a table showing an example of the trail information storage unit;

FIG. 18A is a schematic diagram illustrating an example of a template image of an estimation sheet;

FIG. 18B is a schematic diagram illustrating an example of a template image of an invoice;

FIG. 19 is a table showing an example of sample data stored in the sample data storage unit in a case where a sample extracting unit has extracted 25 samples;

FIG. 20 is a table showing an example of acquisition request data which has been generated for the 25 samples extracted by the sample extracting unit and which is stored in the acquisition request storage unit;

FIG. 21 is a table showing an example of assignment of persons in charge of acquisition;

FIG. 22 is a table showing an example of the acquisition request storage unit in a case where a person-in-charge assigning unit has assigned persons in charge and individual acquisition requests have been transmitted;

FIG. 24 is a table showing an example of a case where image data of a trail is stored in the trail storage unit;

FIG. 25 is a table showing an example of a case where the status of acquisition request data stored in the acquisition request storage unit has been updated to "collected";

FIGS. 26A and 26B are schematic diagrams illustrating the extraction of regions performed by a determining unit;

FIG. 27 is a table showing an example of a case where image data of a trail ID 2222 is stored in the trail storage unit;

FIG. 28 is a table showing an example of a case where the status of acquisition request data stored in the acquisition request storage unit has been updated to "collected";

FIG. 29 is a table showing an example of a case where the determination result of a sample number 1 stored in the determination result storage unit has been updated to "invalid";

FIG. 30 is a table showing an example of a case where the status of acquisition request data stored in the acquisition request storage unit has been updated to "cancelled";

FIG. 32 is a table showing an example of a case where information indicating a region in which information specifying each trail is written is stored in the trail information storage unit;

DETAILED DESCRIPTION

Hereinafter, a first exemplary embodiment of the present invention will be described in detail with reference to the drawings.

Figure 1:
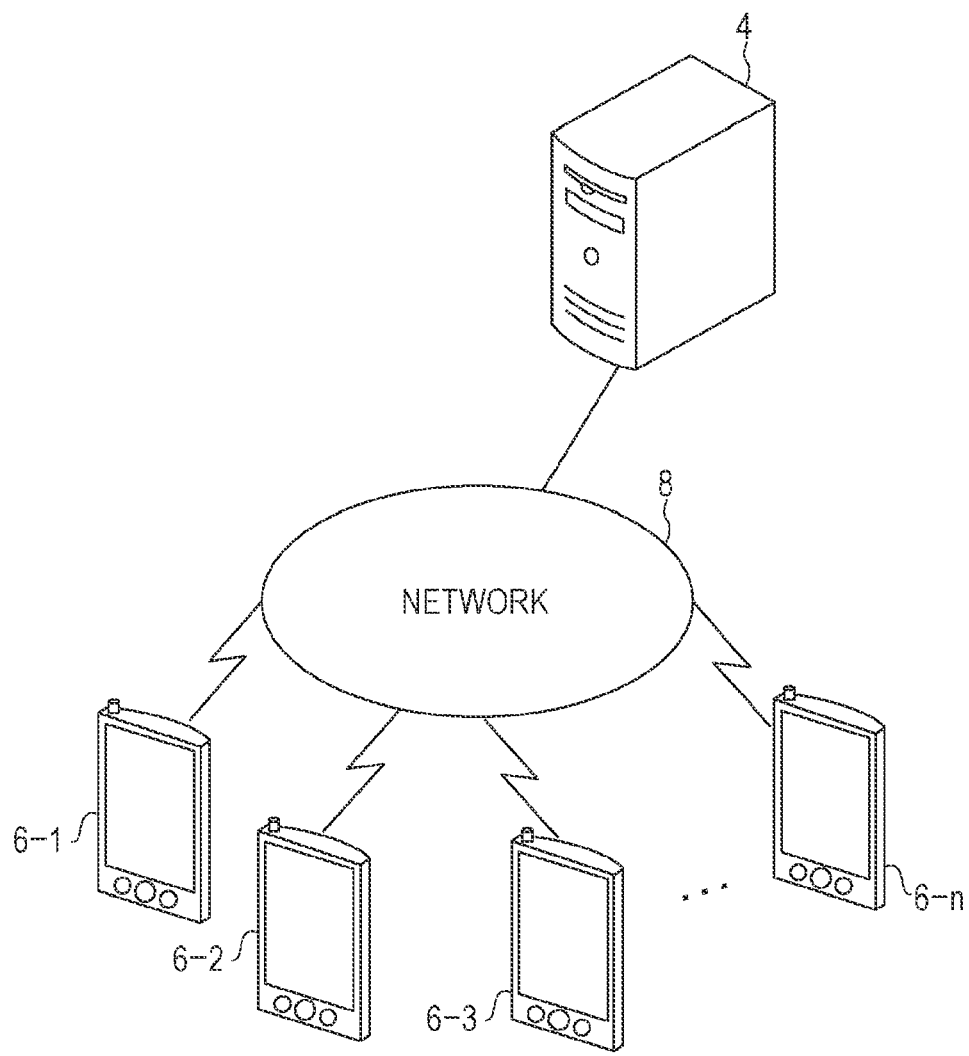
FIG. 1 is a schematic diagram illustrating a trail collection system according to a first exemplary embodiment of the present invention.

FIG. 1 is a schematic diagram illustrating a trail collection system 2 according to the first exemplary embodiment of the present invention. As illustrated in FIG. 1, the trail collection system 2 includes an information processing apparatus 4 and image capture apparatuses 6-1 to 6-n (n is a natural number of one or more). The image capture apparatuses 6-1 to 6-n are connected to the information processing apparatus 4 via a network 8, such as the Internet. In the following description, each of the image capture apparatuses 6-1 to 6-n will be referred to as an "image capture apparatus 6" when they are not distinguished from one another.

The information processing apparatus 4 collects trails. More specifically, the information processing apparatus 4 collects, for example, trails which are necessary for operation assessment of internal control. In operation assessment of internal control, it is determined, on the basis of trails, whether or not control against risk in a business process (internal control activity) is validly functioning. Here, a "trail" is a document (or electronic data) that verifies a fact and details of an action, such as a transaction, and specifically corresponds to, for example, an invoice, a receipt, and a statement of delivery.

Figure 2:
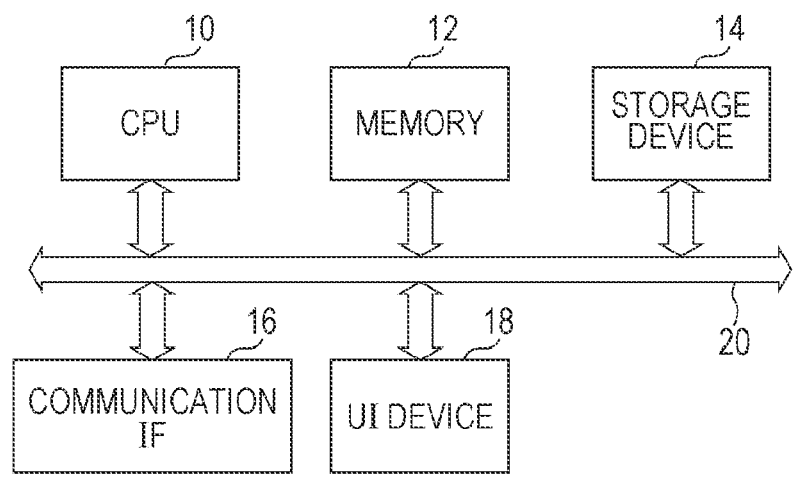
FIG. 2 is a diagram illustrating the hardware configuration of an information processing apparatus.

FIG. 2 is a diagram illustrating the hardware configuration of the information processing apparatus 4.

The information processing apparatus 4 is configured as, for example, a server. As illustrated in FIG. 2, the information processing apparatus 4 includes a central processing unit (CPU) 10, a memory 12, a storage device 14 such as a hard disk drive (HDD), a communication interface (IF) 16 that transmits data to and receives data from an external apparatus via the network 8, and a user interface (UI) device 18 including a touch panel or a liquid crystal display and a keyboard. These elements are connected to one another via a control bus 20.

The CPU 10 executes processing in accordance with a control program stored in the memory 12 or the storage device 14, and controls the operation of the information processing apparatus 4. In this exemplary embodiment, the CPU 10 reads out and executes the control program stored in the memory 12 or the storage device 14. Alternatively, the control program may be stored in a storage medium, such as a compact disc read only memory (CD-ROM), and may be provided to the CPU 10, or may be provided to the CPU 10 via the communication IF 16.

Figure 3:
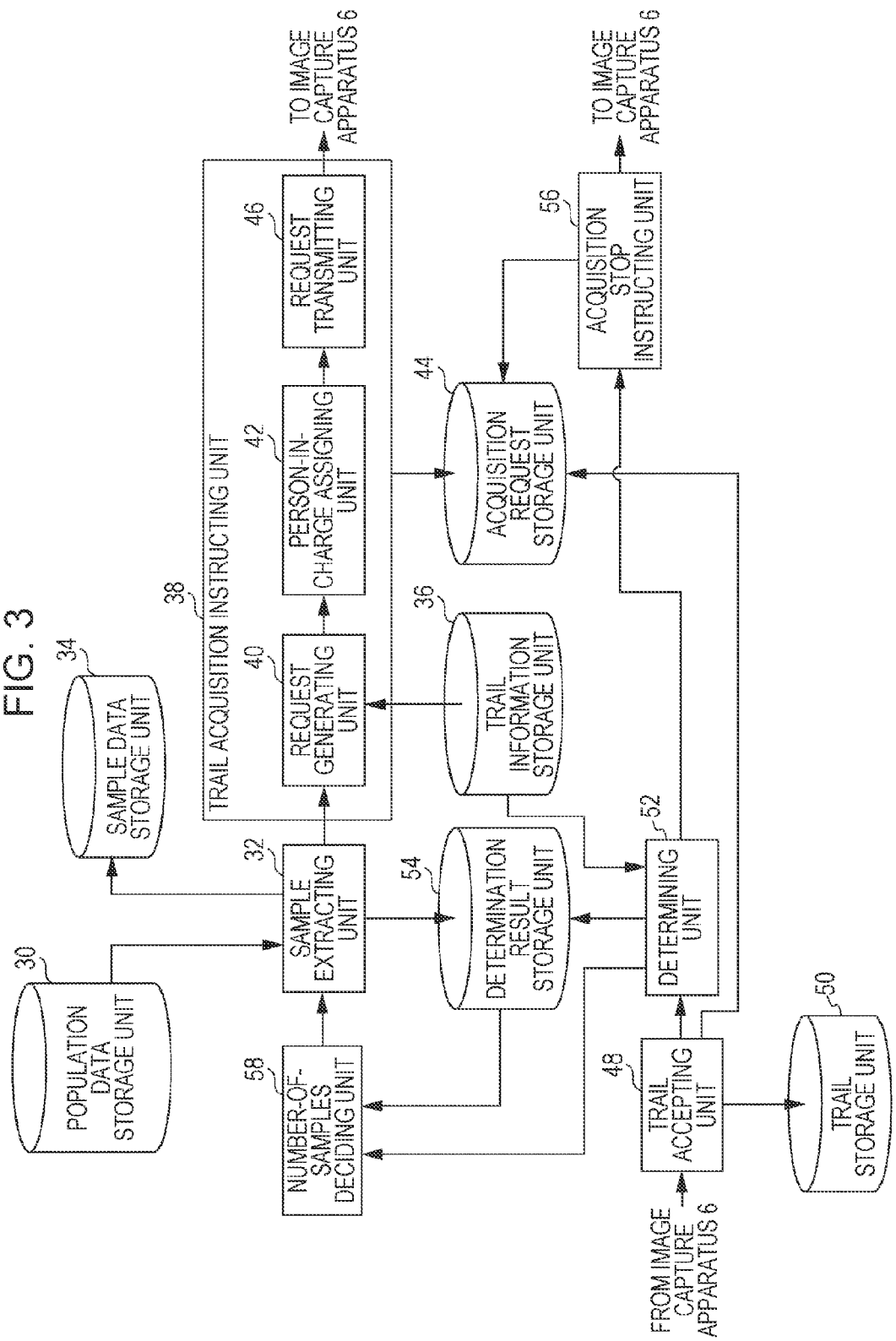
FIG. 3 is a block diagram illustrating the functional configuration of the information processing apparatus which is realized when a control program is executed.

FIG. 3 is a block diagram illustrating the functional configuration of the information processing apparatus 4 which is realized when the above-described control program is executed.

As illustrated in FIG. 3, the information processing apparatus 4 according to this exemplary embodiment includes a population data storage unit 30, a sample extracting unit 32, a sample data storage unit 34, a trail information storage unit 36, a trail acquisition instructing unit 38, a request generating unit 40, a person-in-charge assigning unit 42, an acquisition request storage unit 44, a request transmitting unit 46, a trail accepting unit 48, a trail storage unit 50, a determining unit 52, a determination result storage unit 54, an acquisition stop instructing unit 56, and a number-of-samples deciding unit 58.

The population data storage unit 30 stores a population. Here, a "population" is a set of data representing actions conducted in a business process, which is a target of internal control.

FIG. 4 is a table showing an example of population data stored in the population data storage unit 30. In the example illustrated in FIG. 4, data about attributes, such as a transaction ID, the date on which data was input, a price, a user who input data, an invoice number, and a receipt number, is stored for each transaction.

The sample extracting unit 32 samples data to be tested in operation assessment (extracts samples) from the population stored in the population data storage unit 30. The number of samples extracted by the sample extracting unit 32 is decided by the number-of-samples deciding unit 58, which will be described below. The sample extracting unit 32 stores the data of extracted samples in the sample data storage unit 34. The sample extracting unit 32 may extract samples so that the total number of extracted samples does not exceed a predetermined upper limit.

The sample data storage unit 34 stores the sample data extracted by the sample extracting unit 32.

FIG. 5 is a table showing an example of the sample data stored in the sample data storage unit 34. In the example illustrated in FIG. 5, the sample numbers of individual samples are also stored in addition to the data about attributes stored in the population data storage unit 30.

The trail information storage unit 36 stores information about trails. For example, the trail information storage unit 36 stores information indicating which attribute of data is to be used for specifying each trail.

FIG. 6 is a table showing an example of information about trails, stored in the trail information storage unit 36. In the example illustrated in FIG. 6, a trail ID, an attribute used for specifying the trail, a template image of the trail, a region of the trail used for verification, and a verification condition are stored for each type of trail. Here, the template image, the region of the trail used for verification, and the verification condition are referred to when a determination process is performed by the determining unit 52, which will be described below. The details of the template image, the region of the trail used for verification, and the verification condition will be described below.

The trail acquisition instructing unit 38 instructs the image capture apparatus 6 to acquire a trail of a sample extracted by the sample extracting unit 32. As illustrated in FIG. 3, the trail acquisition instructing unit 38 includes the request generating unit 40, the person-in-charge assigning unit 42, and the request transmitting unit 46.

The request generating unit 40 generates information for requesting acquisition of a trail. The request generating unit 40 according to this exemplary embodiment generates data representing a request for acquiring a trail (hereinafter referred to as acquisition request data) on the basis of the information about the trail stored in the trail information storage unit 36.

Specifically, the request generating unit 40 decides, for each of one or more trails to be acquired for each sample extracted by the sample extracting unit 32, information specifying the trail (hereinafter referred to as trail specification information) on the basis of the information about trails stored in the trail information storage unit 36, and generates acquisition request data including a trail ID and trail specification information.

The person-in-charge assigning unit 42 assigns a person in charge of acquisition to an acquisition request for each trail generated by the request generating unit 40. A person in charge of acquisition may be assigned in accordance with a predetermined rule, or may be assigned in accordance with input by an operator via the UI device 18. Also, the person-in-charge assigning unit 42 may assign a person in charge for each trail on the basis of information about a user who is to acquire the trail. For example, the person-in-charge assigning unit 42 assigns, as a person in charge of acquisition, a user who is expected to be able to efficiently acquire a trail, by using information about a department to which the user belongs or position information about the user.

The acquisition request data to which a person in charge of acquisition has been assigned by the person-in-charge assigning unit 42 is stored in the acquisition request storage unit 44.

The acquisition request storage unit 44 stores the acquisition request data generated by the request generating unit 40. Each piece of the acquisition request data stored in the acquisition request storage unit 44 includes information about a person in charge of acquisition assigned by the person-in-charge assigning unit 42. Also, each piece of the acquisition request data stored in the acquisition request storage unit 44 includes information indicating the current status about acquisition of the trail. The information indicating the current status may be, for example, "not yet requested", "collecting", "collected", and "cancelled". "Not yet requested" indicates that a request has not yet been transmitted by the request transmitting unit 46, which will be described below, "collecting" indicates that a request has been transmitted but a trail has not yet been transmitted from the image capture apparatus 6, "collected" indicates that a trail transmitted from the image capture apparatus 6 has been received and the request has been completed, and "cancelled" indicates that a request for acquiring a trail has been cancelled.

FIG. 7 is a table showing an example of the acquisition request data stored in the acquisition request storage unit 44. As illustrated in FIG. 7, the acquisition request storage unit 44 stores, for each acquisition request, a sample umber, a trail ID, trail specification information, a person in charge of acquisition, and a status of acquisition. As illustrated in FIG. 7, a trail name may also be stored. Additionally, in the example illustrated in FIG. 7, acquisition of three trails "estimation sheet", "invoice", and "receipt" is requested for one sample.

The request transmitting unit 46 transmits acquisition request data to the image capture apparatus 6. Also, the request transmitting unit 46 updates the status about the transmitted acquisition request data to "collecting". In this exemplary embodiment, the request transmitting unit 46 transmits acquisition request data in which a user is assigned as a person in charge of acquisition by the person-in-charge assigning unit 42, to the image capture apparatus 6 used by the user. Alternatively, the request transmitting unit 46 may transmit the acquisition request data to all the image capture apparatuses 6 which are connected to the network 8.

The trail accepting unit 48 accepts trail data transmitted from the image capture apparatus 6. The trail data accepted by the trail accepting unit 48 is stored in the trail storage unit 50. The trail accepting unit 48 accepts, for example, image data captured by the image capture apparatus 6 as trail data. Also, the trail accepting unit 48 updates the status of the piece of acquisition request data corresponding to the accepted trail to "collected" among pieces of acquisition request data stored in the acquisition request storage unit 44.

The trail accepting unit 48 of this exemplary embodiment accepts, as trail data, image data which has been obtained by capturing an image of a trail existing as a recording medium, such as paper, by the image capture apparatus 6. The trail accepting unit 48 may accept trail data existing as electronic data via the network 8, or may accept trail data as electronic data which is stored in a portable storage medium, such as a universal serial bus (USB) memory.

The trail storage unit 50 stores the trail data received from the image capture apparatus 6.

FIG. 8 is a table showing an example of trails stored in the trail storage unit 50. As illustrated in FIG. 8, the trail storage unit 50 stores received trail data in association with a sample number and a trail ID.

The determining unit 52 determines, every time the trail accepting unit 48 accepts a trail, whether the accepted trail is valid or invalid. Specifically, the determining unit 52 determines whether trail data is valid or invalid on the basis of the trail data accepted by the trail accepting unit 48 and the information about the trail stored in the trail information storage unit 36. The determining unit 52 of this exemplary embodiment determines whether the content of a trail is valid or invalid on the basis of the verification condition stored in the trail information storage unit 36. The details about determination will be described below using a specific example.

Determining whether the content of a trail is valid or invalid is determining whether or not the trail satisfies a predetermined condition about the content. If the trail satisfies the predetermined condition, the trail is determined to be valid. If the trail does not satisfy the predetermined condition, the trail is determined to be invalid. In this exemplary embodiment, the predetermined condition about content is a verification condition which defines a condition about content of a trail and which is stored in the trail information storage unit 36.

Also, the determining unit 52 performs determination on a sample corresponding to a trail on the basis of a determination result about the trail, and stores the result in the determination result storage unit 54.

The determining unit 52 may perform determination in accordance with an operation performed by a user via the UI device 18.

FIG. 9 is a table showing an example of information about determination results stored in the determination result storage unit 54. As illustrated in FIG. 9, the determination result storage unit 54 stores "valid" or "invalid" as information about a determination result for each sample. For example, in a case where all the trails corresponding to a target sample are determined to be valid by the determining unit 52, "valid" is stored as information about the determination result for the sample. On the other hand, in a case where all the trails corresponding to a target sample are determined to be invalid by the determining unit 52, "invalid" is stored as information about the determination result for the sample.

In this exemplary embodiment, upon samples being extracted by the sample extracting unit 32, items of the samples illustrated in FIG. 9 are generated for the individual extracted samples, and the result is updated upon determination being performed by the determining unit 52. In FIG. 9, a blank in "result" indicates that not all the trails of the corresponding sample have not yet been collected, but a trail which does not satisfy a verification condition does not exist among the trails which have been collected for the sample.

The acquisition stop instructing unit 56 instructs, if there is a trail whose content has been determined to be invalid by the determining unit 52, the image capture apparatus 6 to stop further acquisition of trails for the sample corresponding to the invalid trail. Also, the acquisition stop instructing unit 56 updates the status of the acquisition request data stored in the acquisition request storage unit 44 to "cancelled", regarding the trail whose acquisition is to be stopped.

In a case where, even if there is a trail whose content has been determined to be invalid by the determining unit 52, further acquisition of trails for the sample corresponding to the invalid trail is not stopped, the acquisition stop instructing unit 56 is not necessary.

Specifically, the acquisition stop instructing unit 56 transmits an instruction indicating cancellation of the trail acquisition request to the image capture apparatus 6 to which the acquisition request data about the target trail whose acquisition is to be stopped has been transmitted.

For example, regarding the sample of sample number 1, if the trail data of "estimation sheet" is accepted and is determined to be invalid by the determining unit 52 in a case where trails of "estimation sheet", "invoice", and "receipt" are necessary, the acquisition stop instructing unit 56 provides an instruction to stop further acquisition of trails of "invoice" and "receipt" whose trail data has not yet been accepted.

The number-of-samples deciding unit 58 decides the number of samples to be extracted on the basis of a predetermined reference value for the number of samples, the number of samples which have already been extracted by the sample extracting unit 32, and the number of samples corresponding to the trails whose content has been determined to be invalid by the determining unit 52.

The predetermined reference value for the number of samples is, for example, a reference value with which it is determined that internal control is validly functioning in an operation assessment test, and may be the minimum number of samples which satisfy a predetermined condition (hereinafter referred to as the minimum number of valid samples), or may be a predetermined value as a percentage of the number of samples which satisfy the predetermined condition with respect to the total number of samples (hereinafter referred to as a valid sample percentage). The minimum number of valid samples and the valid sample percentage are determined on the basis of, for example, an audit method. In this exemplary embodiment, a sample which satisfies the predetermined condition is a sample for which one or more trails satisfying a verification condition have been collected, specifically, a sample which is determined to be valid by the determining unit 52.

For example, it is assumed that it is determined that internal control is validly functioning in a case where the percentage of the number of samples which satisfy the predetermined condition with respect to the total number of samples is 97% or more and where the number of samples which satisfy the predetermined condition is 25 or more. In this case, the value 97% and the value 25 are regarded as reference values. In this case, the number-of-samples deciding unit 58 decides the minimum number of samples to be extracted so that the percentage of the number of samples which satisfy the predetermined condition with respect to the total number of samples is 97% or more and that the number of samples which satisfy the predetermined condition is 25 or more.

Alternatively, the predetermined reference value for the number of samples may be a value which is predetermined as the percentage of the number of samples which do not satisfy the predetermined condition with respect to the total number of samples.

The method for deciding the number of samples used by the number-of-samples deciding unit 58 will be described below by using a specific example.

Next, the image capture apparatus 6 will be described.

The image capture apparatus 6 captures an image of a trail existing as a recording medium, such as paper, and transmits the captured image as trail data to the information processing apparatus 4. The image capture apparatus 6 is configured as, for example, a mobile information terminal such as a personal digital assistance (PDA) or a smart phone.

Figure 10:
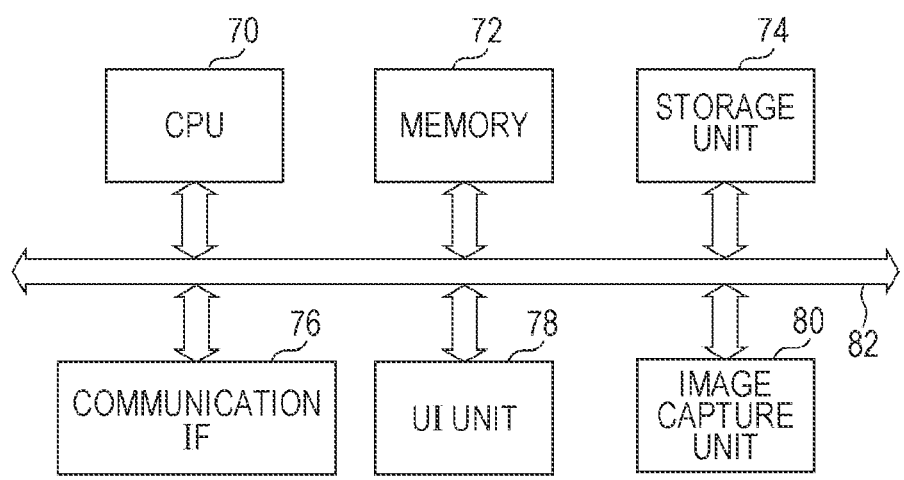
FIG. 10 is a diagram illustrating the hardware configuration of an image capture apparatus.

FIG. 10 is a diagram illustrating the hardware configuration of the image capture apparatus 6.

As illustrated in FIG. 10, the image capture apparatus 6 includes a CPU 70, a memory 72, a storage unit 74 such as an HDD, a communication interface (IF) 76 that transmits data to and receives data from an external apparatus via the network 8, a user interface (UI) unit 78 constituted by a touch panel or the like, and an image capture unit 80 constituted by a camera or the like. These elements are connected to one another via a control bus 82.

The CPU 70 executes processing in accordance with a control program stored in the memory 72 or the storage unit 74, and controls the operation of the image capture apparatus 6. In this exemplary embodiment, the CPU 70 reads out and executes the control program stored in the memory 72 or the storage device 74. Alternatively, the control program may be stored in a storage medium, such as a CD-ROM, and may be provided to the CPU 70, or may be provided to the CPU 70 via the communication IF 76.

Figure 11:
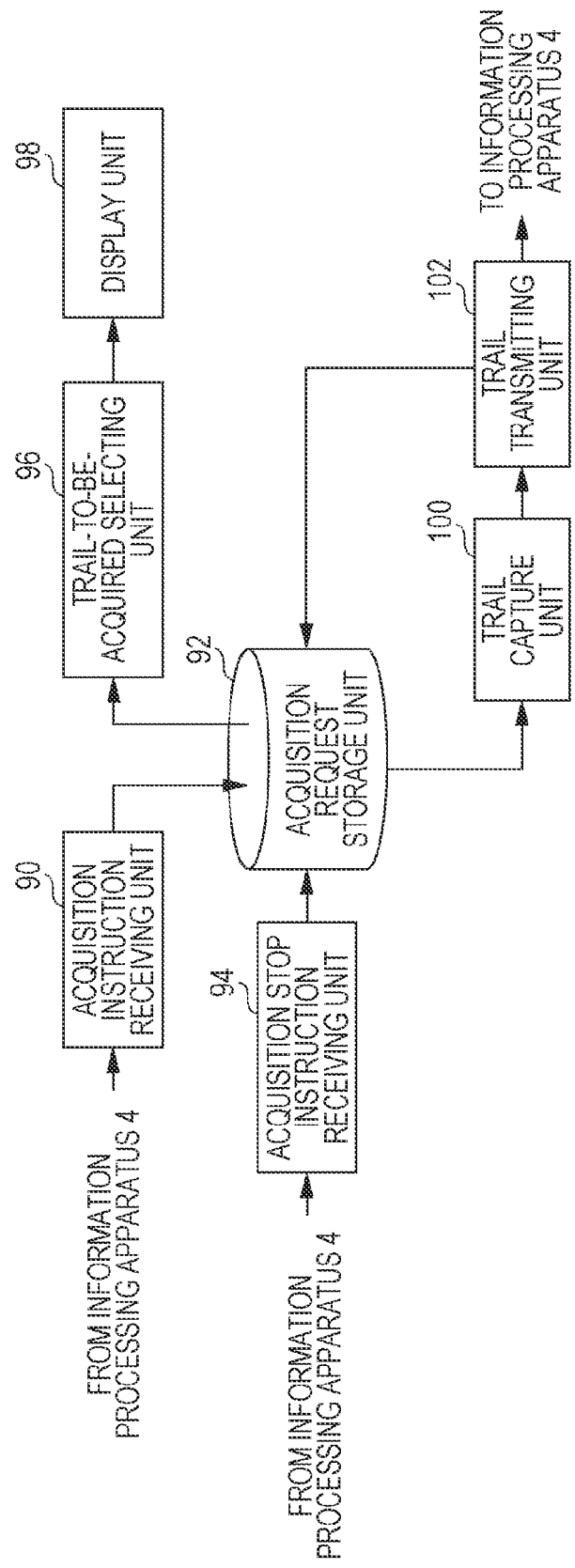
FIG. 11 is a block diagram illustrating the functional configuration of the image capture apparatus which is realized when a control program is executed.

FIG. 11 is a block diagram illustrating the functional configuration of the image capture apparatus 6 which is realized when the above-described control program is executed.

As illustrated in FIG. 11, the image capture apparatus 6 according to this exemplary embodiment includes an acquisition instruction receiving unit 90, an acquisition request storage unit 92, an acquisition stop instruction receiving unit 94, a trail-to-be-acquired selecting unit 96, a display unit 98, a trail capture unit 100, and a trail transmitting unit 102.

The acquisition instruction receiving unit 90 receives an acquisition instruction from the information processing apparatus 4. Specifically, the acquisition instruction receiving unit 90 receives acquisition request data transmitted from the information processing apparatus 4. The received acquisition request data is stored in the acquisition request storage unit 92.

The acquisition request storage unit 92 stores the acquisition request data received by the acquisition instruction receiving unit 90.

FIG. 12 is a table showing an example of the acquisition request data stored in the acquisition request storage unit 92. As illustrated in FIG. 12, the acquisition request storage unit 92 stores, for each acquisition request, a sample number, a trail ID, a trail name, and trail specification information.

The acquisition stop instruction receiving unit 94 receives an acquisition stop instruction from the information processing apparatus 4, and deletes the piece of acquisition request data specified by the acquisition stop instruction to stop acquisition among the pieces of acquisition request data stored in the acquisition request storage unit 92.

The trail-to-be-acquired selecting unit 96 selects a target to be acquired from plural acquisition requests stored in the acquisition request storage unit 92. The trail-to-be-acquired selecting unit 96 may select targets to be acquired in a predetermined order from the plural acquisition requests, or may select targets in accordance with an operation performed by a person in charge of acquisition via the UI unit 78.

Also, the trail-to-be-acquired selecting unit 96 may select targets to be acquired in an acquisition order which is determined on the basis of position information about a person in charge of acquisition, from the plural acquisition requests. For example, the trail-to-be-acquired selecting unit 96 acquires position information about a person in charge of acquisition by using the image capture apparatus 6 having a GPS function, and selects a target on the basis of the position information. The acquisition request data may include position information indicating the position of a trail, and a target to be acquired may be selected on the basis of the position information about the trail and the position information about the person in charge of acquisition.

Alternatively, the trail-to-be-acquired selecting unit 96 may select targets to be acquired in an acquisition order which is determined on the basis of attribute information about trails, from the plural acquisition requests. For example, the acquisition request data may include attribute information about trails (for example, information indicating a department which deals with a trail), and the trail-to-be-acquired selecting unit 96 may sequentially select trails having the same attribute information.

The display unit 98 displays information indicating trails to be acquired which have been selected by the trail-to-be-acquired selecting unit 96.

The trail capture unit 100 captures an image of a trail by using the image capture unit 80, and outputs image data obtained through capturing to the trail transmitting unit 102. The trail capture unit 100 outputs information specifying the trail (for example, a sample number of a trail ID) to the trail transmitting unit 102, together with the image data.

The trail transmitting unit 102 transmits, to the information processing apparatus 4, the image data of the trail and the information specifying the trail output from the trail capture unit 100. Also, the trail transmitting unit 102 deletes the acquisition request data corresponding to the transmitted trail from the acquisition request storage unit 92.

Next, the operation of the trail collection system 2 will be descried.

Figure 13:
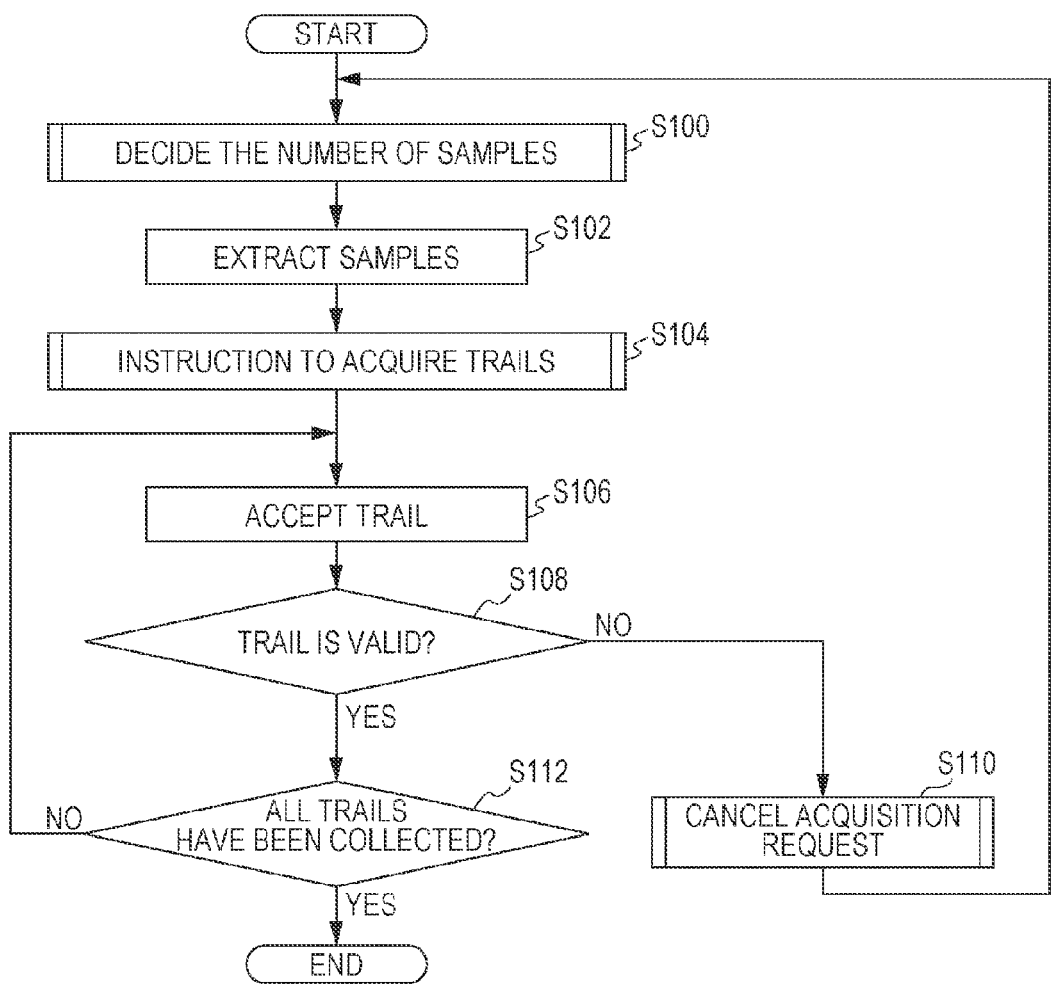
FIG. 13 is a flowchart illustrating an example of an operation performed by the information processing apparatus.

FIG. 13 is a flowchart illustrating an example of the operation performed by the information processing apparatus 4.

In step S100, the number-of-samples deciding unit 58 decides the number of samples to be extracted. The operation of deciding the number of samples will be described below with reference to FIG. 14.

In step S102, the sample extracting unit 32 extracts samples, the number of which is decided in step S100, from the population data storage unit 30.

In step S104, the trail acquisition instructing unit 38 provides an instruction to acquire trails for the samples extracted in step S102. The operation of providing an instruction to acquire trails will be described below with reference to FIG. 15.

In step S106, the trail accepting unit 48 accepts image data of a trail transmitted from the image capture apparatus 6.

In step S108, the determining unit 52 determines, every time the trail accepting unit 48 accepts a trail, whether the content of the accepted trail is valid or invalid. If the content of the trail is invalid, the operation proceeds to step S110. If the content of the trail is valid, the operation proceeds to step S112.

In step S110, the acquisition stop instructing unit 56 instructs the image capture apparatus 6 to stop further acquisition of trails for the sample corresponding to the trail which is determined to be invalid in step S108. The operation of providing an instruction to stop acquisition will be described below with reference to FIG. 16. Subsequently, the operation returns to step S100, where the number of samples to be additionally extracted is decided. In step S102, the samples to be additionally extracted are extracted. In step S104, an instruction to acquire trails is provided again. The instruction provided here is an instruction to acquire trails for the additionally extracted samples.

In step S112, it is determined whether or not all the trails to be acquired in response to the instruction provided by the trail acquisition instructing unit 38 have been collected. If the collection has been completed, the operation returns to step S106. If the collection has been completed, the operation ends.

As may be understandable from the above-described flowchart, in a case where M samples are extracted first, decision of the number of additional samples and transmission of a request for collecting trails for the additional samples are not performed after all the trails for the M samples have been collected, but decision of the number of additional samples and transmission of a request for collecting trails for the additional samples are performed every time a trail is collected.

For example, in addition to extraction of samples the number of which is specified by an auditor and collection of trails, auxiliary samples are extracted in case the population has failure or a sample for which control is not validly functioning is included. In a case where trails are collected at the same time as the samples and where auxiliary samples are not used, the time to collect the trails is wasted. In a case where samples more than auxiliary samples are necessary, an audit time is set by both of an auditor side and an audited department, and extraction of samples and collection of trails are performed.

On the other hand, in a case where decision of the number of additional samples and transmission of a request for collecting trails for the additional samples are performed every time a trail is collected, as in the above-described flowchart, the trails necessary for audit are efficiently collected compared to a case in which auxiliary samples are extracted in advance.

Next, the operation of deciding the number of samples in the above-described step S100 will be described.

FIG. 14 is a flowchart illustrating an example of the operation of deciding the number of samples.

In step S200, the number-of-samples deciding unit 58 acquires a predetermined reference value for the number of samples. For example, the number-of-samples deciding unit 58 acquires the above-described minimum number of valid samples and valid sample percentage. The minimum number of valid samples and the valid sample percentage may be input via the UI device 18 or may be stored in the storage device 14 in advance.

In step S202, the number-of-samples deciding unit 58 acquires the number of samples which have already been extracted. For example, the number-of-samples deciding unit 58 acquires the number of samples which have already been extracted, with reference to the information stored in the determination result storage unit 54.

In step S204, the number-of-samples deciding unit 58 acquires the number of samples which have been determined to be invalid. For example, the number-of-samples deciding unit 58 acquires the number of samples whose determination result is invalid, with reference to the information stored in the determination result storage unit 54.

In step S206, the number-of-samples deciding unit 58 decides the number of samples to be newly extracted from the population data storage unit 30, in accordance with the reference value, the number of extracted samples, and the number of invalid samples obtained in steps S200 to S204.

In step S206, the number-of-samples deciding unit 58 decides the number of samples in the following manner, for example. Here, the minimum number of valid samples is represented by M, the valid sample percentage is represented by P, the number of extracted samples is represented by N, and the number of invalid samples is represented by F.

First, the number-of-samples deciding unit 58 calculates the number of samples to be extracted X1 (integer) which is necessary to satisfy the minimum number of valid samples, by using the following expression (1).

$$X1+N-F=M \quad (1)$$

Subsequently, the number-of-samples deciding unit 58 calculates the number of samples to be extracted X2 (integer) which is necessary to satisfy the valid sample percentage, by using the following expression (2).

$$(X2+N-F)/(X2+N) \geq P \quad (2)$$

The number-of-samples deciding unit 58 decides the larger value among the calculated X1 and X2 to be the number of samples to be extracted.

Next, the operation of providing an instruction to acquire trails in the above-described step S104 will be described.

FIG. 15 is a flowchart illustrating an example of the operation of providing an instruction to acquire trails.

In step S300, the request generating unit 40 generates acquisition request data for the samples extracted by the sample extracting unit 32.

In step S302, the person-in-charge assigning unit 42 assigns a person in charge of acquisition to the acquisition request for each trail generated by the request generating unit 40.

In step S304, the request transmitting unit 46 transmits the acquisition request data to the image capture apparatus 6.

In step S306, it is determined whether or not there is a sample for which a trail acquisition instruction has not been provided among the samples extracted by the sample extracting unit 32, and steps S300 to S304 are performed on the sample.

Next, the operation of providing an acquisition stop instruction in the above-described step S110 will be described.

FIG. 16 is a flowchart illustrating an example of the operation of providing an acquisition stop instruction.

In step S400, the acquisition stop instructing unit 56 acquires, from the acquisition request storage unit 44, the acquisition request data for the other trails of the sample corresponding to the trail whose content has been determined to be invalid by the determining unit 52.

In step S402, the acquisition stop instructing unit 56 determines whether or not the status of the acquisition request data acquired in step S400 is "collecting". If the status is "collecting", the operation proceeds to step S406. If the status is not "collecting", the operation proceeds to step S404.

In step S404, the acquisition stop instructing unit 56 determines whether or not the status of the acquisition request data acquired in step S400 is "not yet requested". If the status is "not yet requested", the operation proceeds to step S406. If the status is not "not yet requested", the operation ends.

In step S406, the acquisition stop instructing unit 56 instructs the image capture apparatus 6 to stop acquisition of the trail for which the status of the acquisition request data is "collecting" or "not yet requested".

Next, the operation of the trail collection system 2 will be described by using a specific example. Here, it is assumed that the pieces of information illustrated in FIGS. 17A and 17B are stored in the population data storage unit 30 and the trail information storage unit 36, respectively.

Figures 18A, 18B:
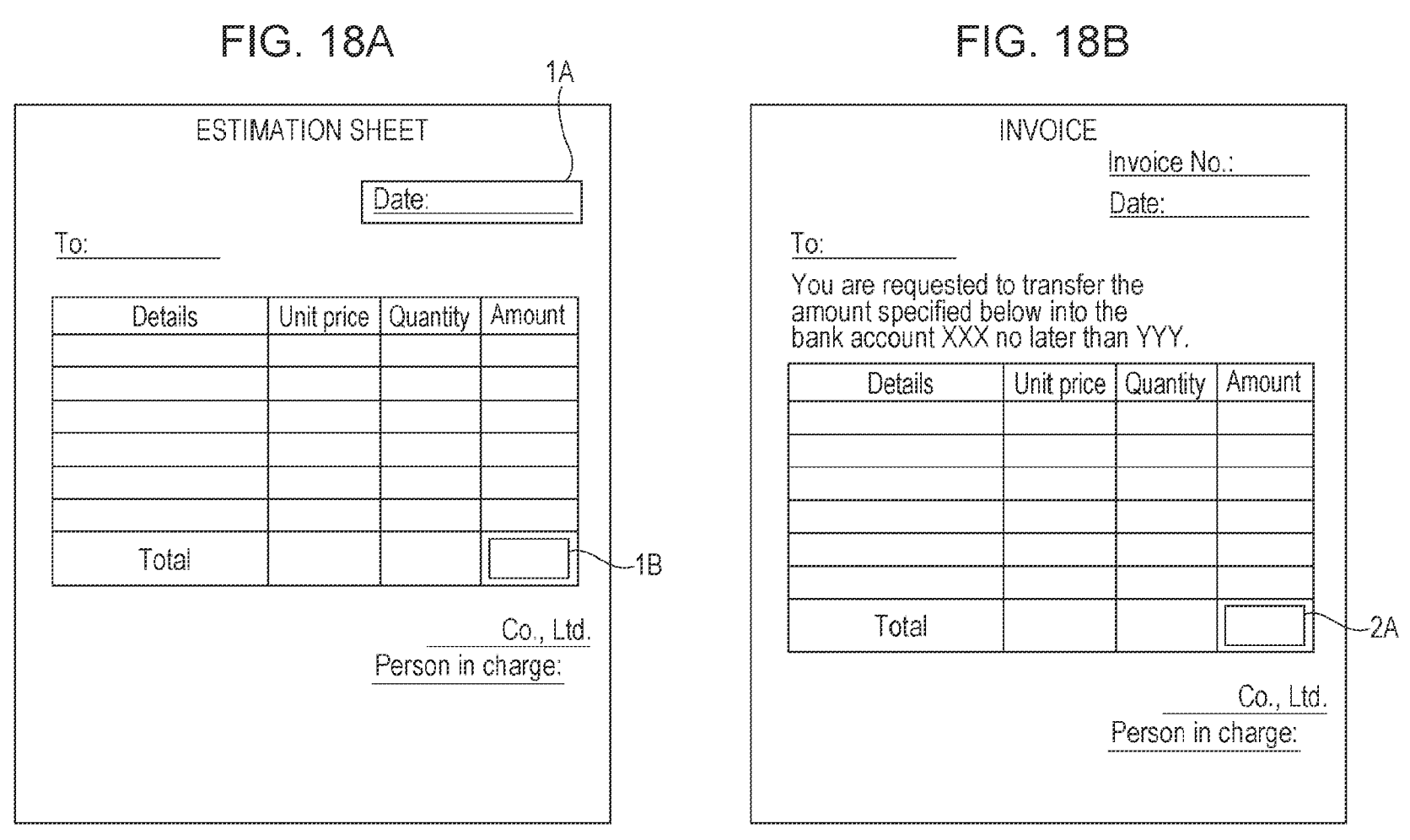

FIG. 18A is a schematic diagram illustrating an example of the template image of the trail ID "1111" illustrated in FIG. 17B, and FIG. 18B is a schematic diagram illustrating an example of the template image of the trail ID "2222" illustrated in FIG. 17B. In the examples illustrated in FIGS. 18A and 18B, a verification region 1A is a field in which the creation date of the estimation sheet is to be written, a verification region 1B is a field of the estimation sheet in which the total amount is to be written, and a verification region 2A is a field of the invoice in which the total amount is to be written.

In the specific example described below, the minimum number of valid samples is 25, and the valid sample percentage is 97%. At this time, the number-of-samples-deciding unit 58 calculates X1=25 by using the above expression (1), calculates X2=1 by using the above expression (2), and decides that the number of samples to be extracted is 25.

FIG. 19 is a table showing an example of sample data stored in the sample data storage unit 34 in a case where the sample extracting unit 32 has extracted 25 samples.

FIG. 20 is a table showing an example of acquisition request data which has been generated for the 25 samples extracted by the sample extracting unit 32 and which is stored in the acquisition request storage unit 44.

In the example illustrated in FIG. 20, a person in charge of acquisition is not assigned to each trail.

Here, as illustrated in FIG. 21, it is assumed that persons in charge of acquisition are predetermined for individual trail IDs. FIG. 22 illustrates the state of the acquisition request storage unit 44 in a case where the person-in-charge assigning unit 42 has assigned persons in charge on the basis of the table illustrated in FIG. 21 and individual acquisition requests have been transmitted.

On the other hand, in the image capture apparatus 6 of User AAA which has received a trail acquisition instruction from the information processing apparatus 4, the information illustrated in FIG. 12 is stored in the acquisition request storage unit 92.

In the image capture apparatus 6 of User AAA, the trail-to-be-acquired selecting unit 96 selects a trail to be acquired, and the display unit 98 displays the information indicating the trail to be acquired. Here, it is assumed that the trail-to-be-acquired selecting unit 96 selects the trail in the uppermost row in the acquisition request data stored in the acquisition request storage unit 92.

Figure 23:
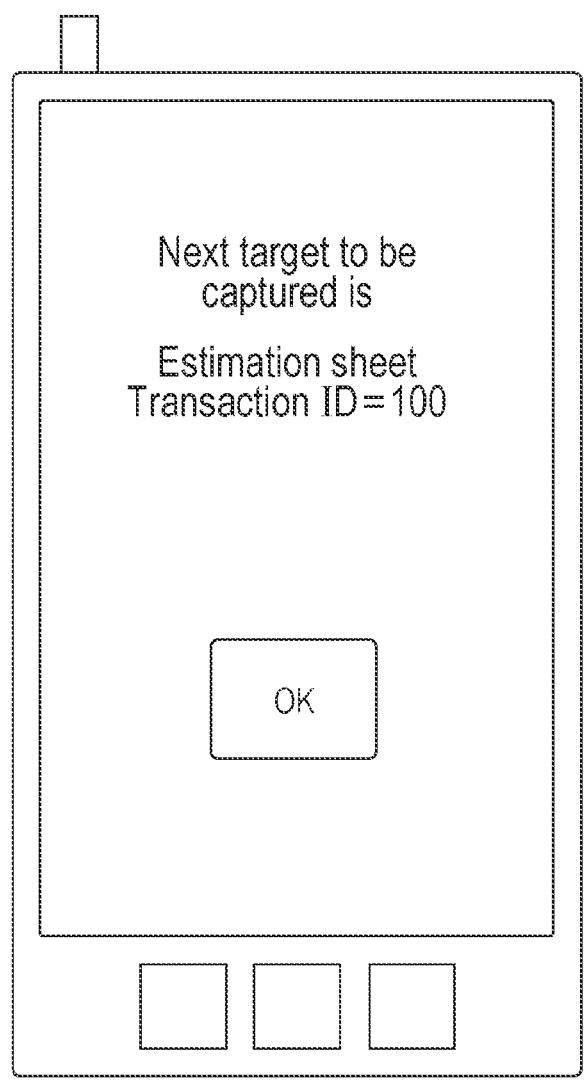
FIG. 23 is a schematic diagram illustrating an example of display performed by a display unit of the image capture apparatus.

FIG. 23 is a schematic diagram illustrating an example of display performed by the display unit 98 of the image capture apparatus 6. For example, if a person in charge of acquisition performs an operation of selecting "OK" on the display screen illustrated in FIG. 23, the image capture apparatus 6 shifts to an image capture mode.

After an image of a trail has been captured by the person in charge of acquisition, the image data of the captured trail is transmitted from the image capture apparatus 6 to the information processing apparatus 4. In the image capture apparatus 6, the trail request data about the transmitted trail is deleted from the acquisition request storage unit 92.

In the information processing apparatus 4, when the trail is received from the image capture apparatus 6, the image data of the transmitted trail is stored in the trail storage unit 50 as illustrated in FIG. 24, and the status of the acquisition request data stored in the acquisition request storage unit 44 is updated to "collected" as illustrated in FIG. 25.

Now, determination performed by the determining unit 52 will be described. First, the determining unit 52 extracts an image region of a trail portion from the image data received from the image capture apparatus 6. The image region of the trail portion is extracted by using, for example, a technique according to the related art, such as a region extraction technique or a template matching technique. Subsequently, the determining unit 52 extracts a region to be used for determination of the trail (the above-described verification region) from the extracted image region of the trail portion. Furthermore, the determining unit 52 recognizes the information written in the verification region by performing character recognition, such as optical character recognition (OCR), on the extracted image in the verification region, and determines whether or not the recognized information satisfies the verification condition of the trail stored in the trail information storage unit 36.

FIGS. 26A and 26B are schematic diagrams illustrating the extraction of regions performed by the determining unit 52. As illustrated in FIG. 26A, the determining unit 52 extracts an image region 112 of a trail portion from image data 110 which has been received from the image capture apparatus 6. Also, as illustrated in FIG. 26B, the determining unit 52 extracts verification regions 114 from the image region 112 of the trail portion.

Now, description will be given of the determination performed by the determining unit 52 on the image data having the trail ID "1111" which has been transmitted from the image capture apparatus 6. As illustrated in FIG. 17B, a first verification condition of the verification region 1A is that the date is included in the range from Apr. 1, 2010 to Mar. 31, 2011. In the trail illustrated in FIGS. 26A and 26B, the date is Feb. 1, 2011, which satisfies the first verification condition. Also, as illustrated in FIG. 17B, a second verification condition of the image data having the trail ID "1111" is that the information written in the verification region 1B is the same as the information written in the verification region 2A of the image data having the trail ID "2222". However, at present, the image data having the trail ID "2222" has not yet been collected, and thus determination about the second verification condition is not performed now (information in the determination result storage unit 54 is not updated), and the determination is performed after the image data of the trail ID "2222" has been collected.

Next, it is assumed that the image data having the trail ID "2222" is collected in a state where the image data having the trail ID "1111" has been collected. Additionally, it is assumed that the image data having the trail ID "2222" which is collected is determined to be invalid by the determining unit 52. Specifically, it is assumed that the information written in the verification region 2A of the image data having the trail ID "2222" is "¥3,200".

In the information processing apparatus 4, when the image data having the trail ID "2222" is received from the image capture apparatus 6, the transmitted image data of the trail is stored in the trail storage unit 50 as illustrated in FIG. 27, and the status of the acquisition request data stored in the acquisition request storage unit 44 is updated to "collected" as illustrated in FIG. 28.

As illustrated in FIG. 17B, the second verification condition of the image data having the trail ID "1111" is that the information written in the verification region 1B is the same as the information written in the verification region 2A of the image data having the trail ID "2222". However, the information written in the verification region 1B is "¥4,500", and the information written in the verification region 2A is "¥3,200", which are different. Also, the verification condition of the image data having the trail ID "2222" is that the information written in the verification region 2A is the same as the information written in the verification region 1B of the image data having the trail ID "1111". However, these pieces of information are different.

In this way, both of the trail having the trail ID "1111" and the trail having the trail ID "2222" are determined to be invalid by the determining unit 52. In accordance with this result, the determining unit 52 determines that the sample having the sample number 1 is invalid, and updates the determination result of the sample number 1 stored in the determination result storage unit 54 to "invalid" as illustrated in FIG. 29.

Also, the determining unit 52 outputs the sample number corresponding to the determination result "invalid" to the acquisition stop instructing unit 56. The acquisition stop instructing unit 56 acquires, from the acquisition request storage unit 44, the acquisition request data for the other trails of the sample number output from the determining unit 52, and instructs the image capture apparatus 6 to stop acquisition of a trail whose status of the acquisition request data is "collecting" or "not yet requested". Also, as illustrated in FIG. 30, the acquisition stop instructing unit 56 updates the status of the acquisition request data stored in the acquisition request storage unit 44 to "cancelled" regarding the trail of which acquisition is stopped. In the image capture apparatus 6 which has received the acquisition stop instruction, the piece of acquisition request data corresponding to the trail of which acquisition is stopped is deleted among the pieces of acquisition request data stored in the acquisition request storage unit 44.

On the other hand, the number-of-samples deciding unit 58 decides the number of samples to be additionally extracted. The number-of-samples deciding unit 58 calculates X1=1 by using the above expression (1), calculates X2=9 by using the above expression (2), and decides the number of samples to be extracted to be 9. Accordingly, the sample extracting unit 32 further extracts samples. Also, the trail acquisition instructing unit 38 provides an instruction again to collect trails for the additionally extracted samples.

Next, a second exemplary embodiment of the present invention will be described. In the information processing apparatus 4 according to the first exemplary embodiment, the determining unit 52 determines whether the content of a trail is valid or invalid. In the second exemplary embodiment, it is also determined whether the form of a trail is valid or invalid.

Determining whether the form of a trail is valid or invalid is determining whether the trail satisfies a predetermined condition about a form. If the trail satisfies the predetermined condition, it is determined that the trail is valid. If the trail does not satisfy the predetermined condition, it is determined that the trail is invalid. The predetermined condition about a form is that, for example, the trail is a target to be acquired, a verification region as a target to be determined of the content of the trail is included in image data, and the image data has at least a predetermined image quality.

Figure 31:
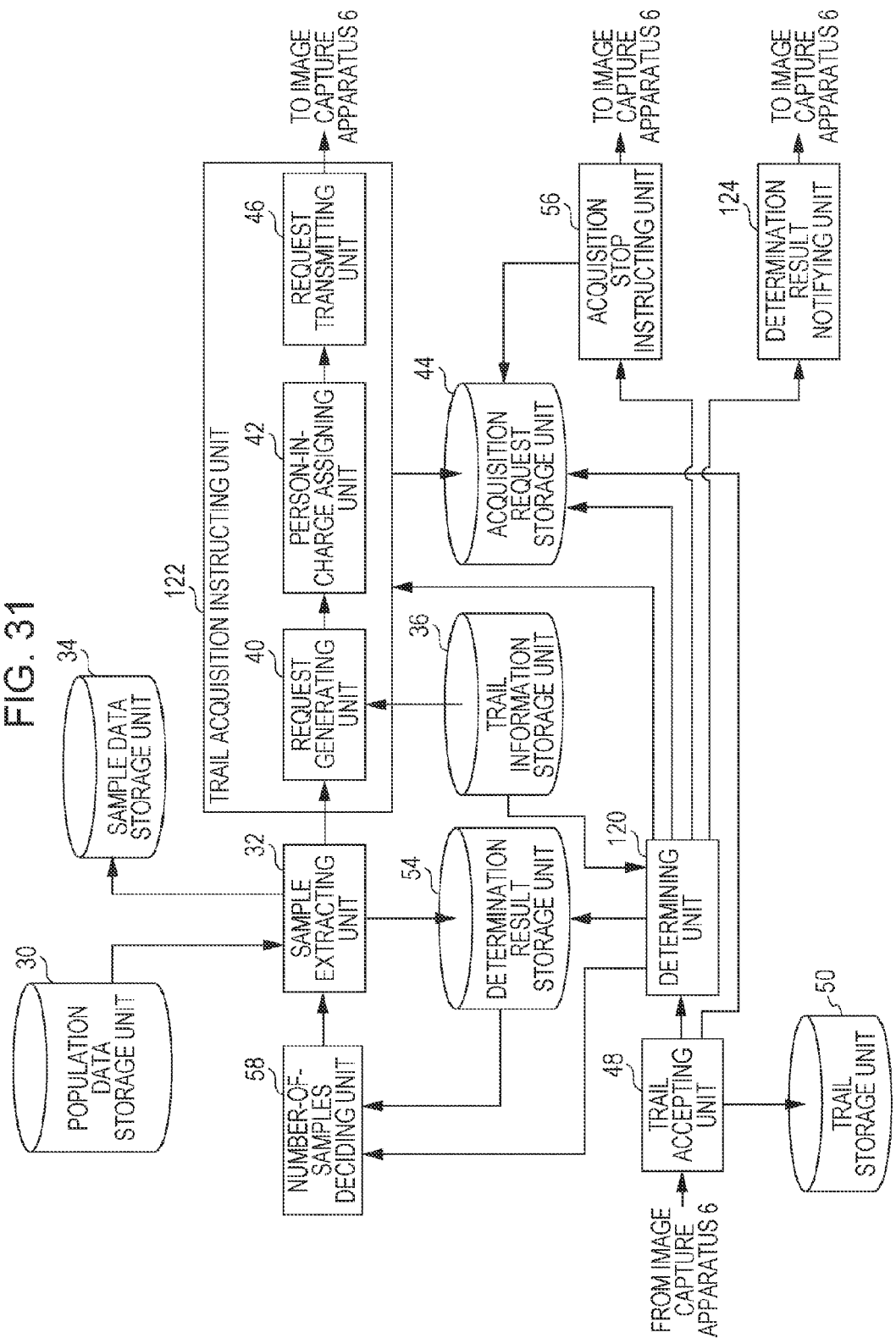
FIG. 31 is a block diagram illustrating the functional configuration of the information processing apparatus which is realized when a control program is executed in a second exemplary embodiment.

FIG. 31 is a block diagram illustrating the functional configuration of the information processing apparatus 4 which is realized when a control program is executed in the second exemplary embodiment.

As illustrated in FIG. 31, the information processing apparatus 4 according to the second exemplary embodiment is different from the information processing apparatus 4 according to the first exemplary embodiment in that the determining unit 52 is replaced by a determining unit 120, the trail acquisition instructing unit 38 is replaced by a trail acquisition instructing unit 122, and a determination result notifying unit 124 is added.

The determining unit 120 has the function of the determining unit 52 according to the first exemplary embodiment, and also determines, every time the trail accepting unit 48 accepts a trail, whether the form of the accepted trail is valid or invalid.

Specifically, as illustrated in FIG. 32, information indicating the regions where information specifying individual trails (trail specification information) is written is stored in the trail information storage unit 36. The determining unit 120 extracts, from image data, the region where the trail specification information is written (specification information region in FIG. 32) on the basis of the information stored in the trail information storage unit 36, recognizes the information written in the extracted region by using character recognition, such as OCR, and determines whether the form of the image data of the acquired trail is valid or invalid.

If the form is valid, the determining unit 120 updates the status of the piece of acquisition request data corresponding to the accepted trail among the pieces of acquisition request data stored in the acquisition request storage unit 44 to "collected", and also determines whether the content of the trail is valid or invalid, like the determining unit 52 according to the first exemplary embodiment. Additionally, if the form is valid, the determining unit 120 outputs, to the determination result notifying unit 124, the trail ID of the trail whose form has been determined to be valid, the sample number of the trail, and a result indicating that the trail has been determined to be valid.

On the other hand, if the form is invalid, the determining unit 120 outputs, to the trail acquisition notifying unit 122, the trail ID of the trail whose form has been determined to be invalid, and the sample number of the trail. Additionally, if the form is invalid, the determining unit 120 outputs, to the determination result notifying unit 124, the trail ID of the trail whose form has been determined to be invalid, the sample number of the trail, and a result indicating that the trail has been determined to be invalid.

Upon the trail ID of the trail whose form has been determined to be invalid and the sample number of the trail being output from the determining unit 120, the trail acquisition instructing unit 122 provides an instruction again to acquire a trail whose form is valid regarding the trail specified by the trail ID and the sample number. In this case, the trail acquisition instructing unit 122 provides the instruction to, for example, the image capture apparatus 6 of the user who is assigned as the person in charge of acquisition of the trail.

Upon the trail ID, the sample number, and the determination result indicating valid or invalid being output from the determining unit 120, the determination result notifying unit 124 transmits these pieces of information to the image capture apparatus 6 of the person in charge of acquisition of the trail.

Figure 33:
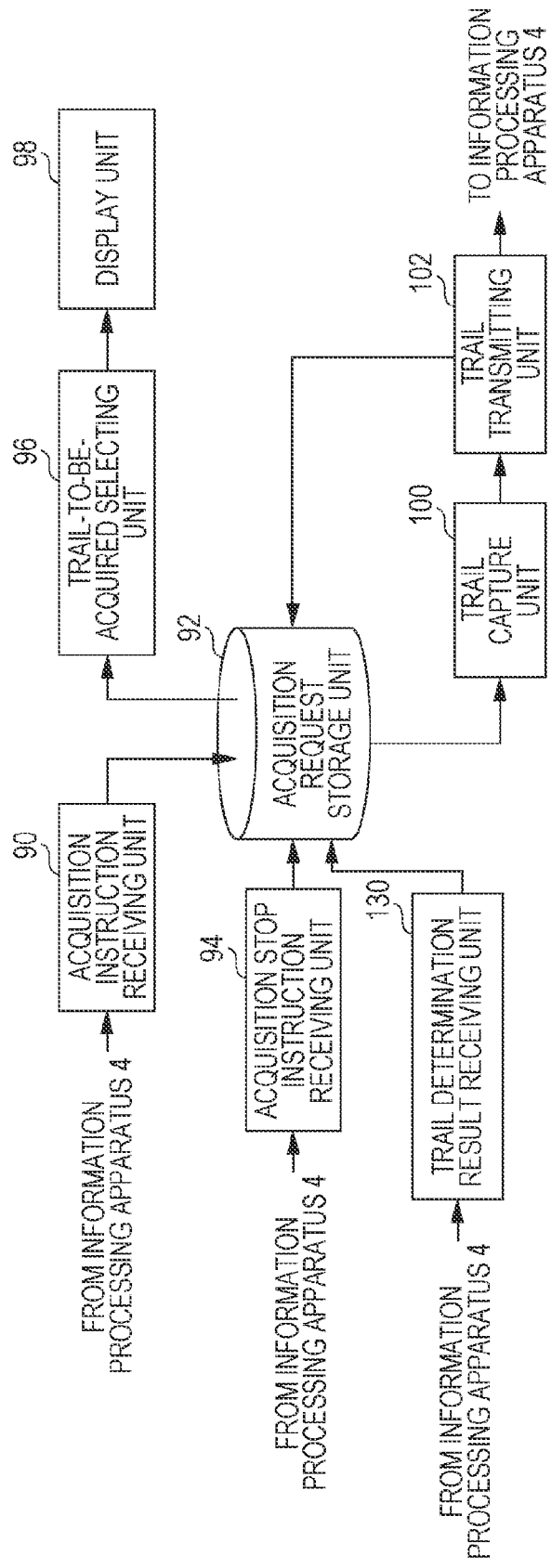
FIG. 33 is a block diagram illustrating the functional configuration of the image capture apparatus which is realized when a control program is executed in the second exemplary embodiment.

FIG. 33 is a block diagram illustrating the functional configuration of the image capture apparatus 6 which is realized when the control program is executed in the second exemplary embodiment.

As illustrated in FIG. 33, the image capture apparatus 6 according to the second exemplary embodiment is different from the image capture apparatus 6 according to the first exemplary embodiment in that a trail determination result receiving unit 130 is added.

The trail determination result receiving unit 130 receives information which has been transmitted from the determination result notifying unit 124 of the information processing apparatus 4. Upon receiving information indicating that a trail has been determined to be valid, the trail determination result receiving unit 130 deletes the acquisition request data which is specified by the trail ID and the sample number from the acquisition request storage unit 92. In the first exemplary embodiment, after the trail transmitting unit 102 has transmitted a trail, the corresponding acquisition request data is deleted from the acquisition request storage unit 92. In the second exemplary embodiment, the acquisition request data is deleted when it is determined that the form of the trail is valid.

Figure 34:
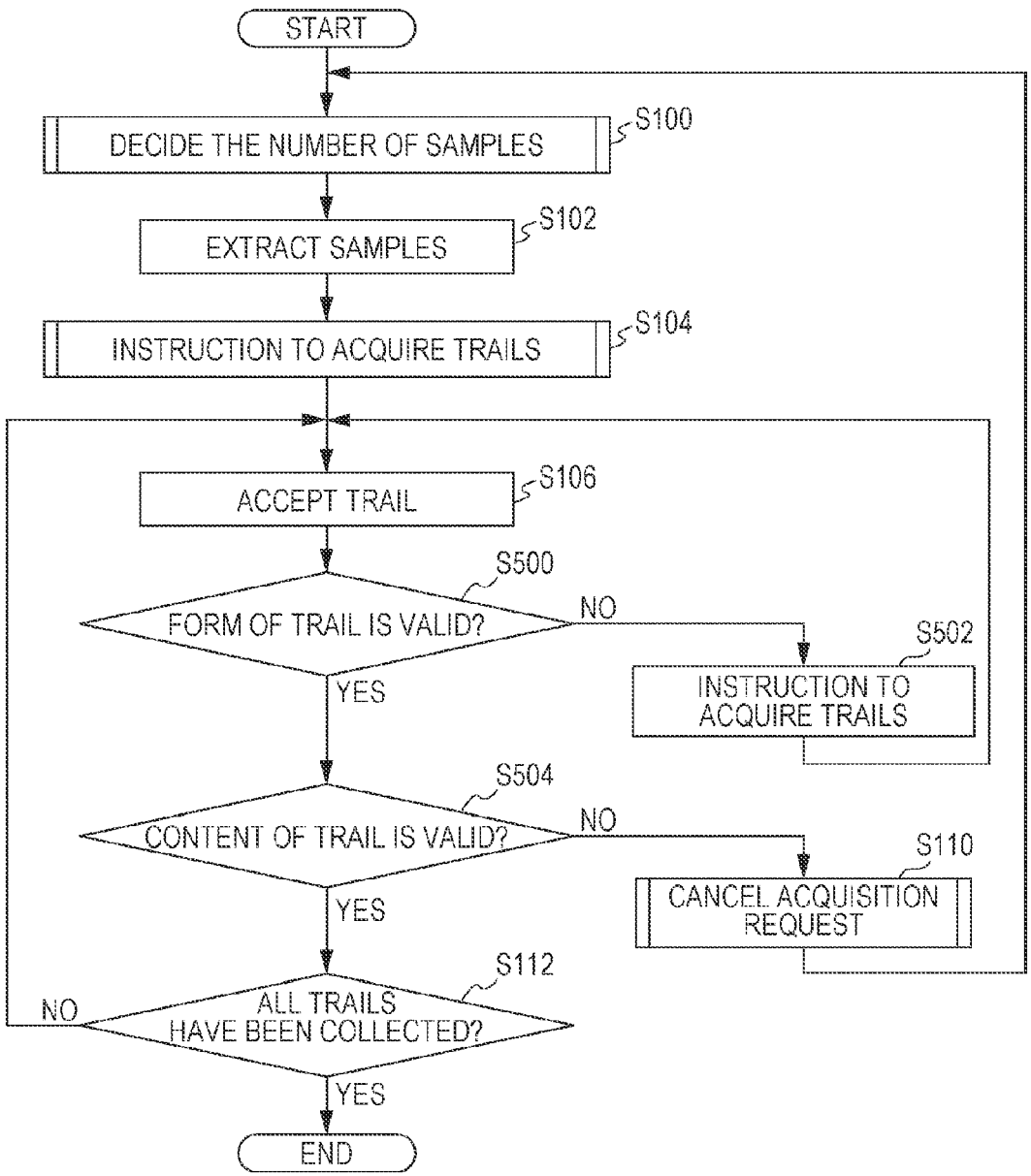
FIG. 34 is a flowchart illustrating an example of an operation performed by the information processing apparatus according to the second exemplary embodiment.

FIG. 34 is a flowchart illustrating an example of the operation performed by the information processing apparatus 4 according to the second exemplary embodiment. In FIG. 34, the same steps as those in the flowchart illustrated in FIG. 13 are denoted by the same reference numerals, and the corresponding description will be omitted.

In step S500, every time the trail accepting unit 48 accepts a trail, the determining unit 120 determines whether or not the form of the accepted trail is valid or invalid. If the form of the trail is invalid, the operation proceeds to step S502. If the form of the trail is valid, the operation proceeds to step S504.

The determining unit 120 extracts, from the image data of the trail accepted by the trail accepting unit 48, partial image data of a region where trail specification information is written, reads the content written therein by using OCR, and determines whether or not the read content matches the trail specification information about the trail to be acquired. If the determination result is "match", the determining unit 120 determines that the form of the trail is valid. If the determination result is "mismatch", the determining unit 120 determines that the form of the trail is invalid.

For example, the following case is assumed. Although the trail having the trail ID "1111" (trail specification information is "transaction ID=5013") is to be acquired for the sample of the sample number 1, the person in charge of acquisition captures an image of another trail by mistake (trail specification information is "transaction ID=8024") and transmits the image data. In this case, the trail specification information read from the image data ("transaction ID=8024") does not match the trail specification information of the trail ID "1111" for the sample of the sample number 1 ("transaction ID=5013"), and thus the determining unit 120 determines that the form of the acquired trail is invalid.

In step S502, the trail acquisition instructing unit 122 provides an instruction to acquire a trail whose form is valid regarding the trail whose form has been determined to be invalid, and the operation returns to step S106.

In step S504, as in step S108 illustrated in FIG. 13, the determining unit 120 determines whether the content of the trail accepted by the trail accepting unit 48 is valid or invalid. If the content of the trail is invalid, the operation proceeds to step S110. If the content of the trail is valid, the operation proceeds to step S112.

In the above-descried second exemplary embodiment, the determining unit 120 determines whether the form of a trail is valid or invalid, and determines whether the content of the trail is valid or invalid. Alternatively, the determining unit 120 may only determine whether the form of a trail is valid or invalid. In this case, steps S504 and S110 are omitted in the flowchart illustrated in FIG. 34.

Next, a third exemplary embodiment of the present invention will be described. In the image capture apparatus 6 according to the first and second exemplary embodiments, a person in charge of acquisition captures an image of a specified trail and transmits captured image data. In this exemplary embodiment, the person in charge of acquisition captures images of certain plural trails, and the image capture apparatus 6 transmits, to the information processing apparatus 4, a piece of image data corresponding to the trail to be acquired among pieces of captured image data.

In the third exemplary embodiment, description will be given of an example in which a moving image is captured by the image capture apparatus 6, and the image data of a trail to be acquired is extracted from the captured moving image. The type of image to be captured is not limited to a moving image, and may be a still image as long as images of certain plural trails are captured.

Figure 35:
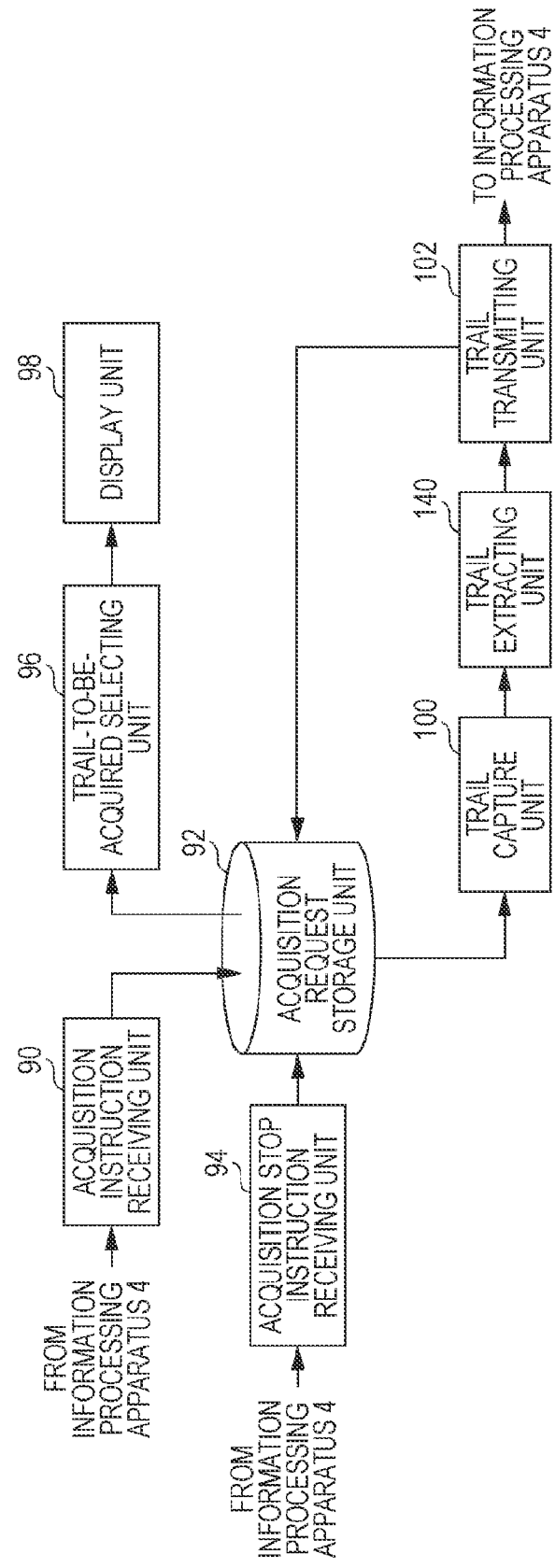
FIG. 35 is a block diagram illustrating the functional configuration of the image capture apparatus which is realized when a control program is executed in a third exemplary embodiment.

FIG. 35 is a block diagram illustrating the functional configuration of the image capture apparatus 6 which is realized when a control program is executed in the third exemplary embodiment.

As illustrated in FIG. 35, the information processing apparatus 4 according to the third exemplary embodiment is different from the information processing apparatus 4 according to the first exemplary embodiment in that a trail extracting unit 140 is added. In a case where the information processing apparatus 4 according to the third exemplary embodiment corresponds to the information processing apparatus 4 according to the second exemplary embodiment, the trail determination result receiving unit 130 is also provided.

The trail extracting unit 140 extracts, from the trails captured by the trail capture unit 100, a trail specified to be acquired by the information processing apparatus 4. In this exemplary embodiment, the trail capture unit 100 captures a moving image of plural trails.

Specifically, for example, the information processing apparatus 4 transmits the trail information illustrated in FIG. 32 together with a trail acquisition instruction, and the image capture apparatus 6 stores the trail information in, for example, the acquisition request storage unit 44. On the basis of the trail information, the image capture apparatus 6 determines whether or not a frame of the trail to be acquired is included in the frames of the moving image captured thereby.

For example, in a manner similar to that described above with reference to FIG. 26A, the trail extracting unit 140 extracts an image region of a trail portion from the image of each frame captured by the trail capture unit 100, and determines whether or not the difference between the image of the trail portion and the template image included in the trail information illustrated in FIG. 32 is within a predetermined range. If the difference is within the predetermined range, the trail extracting unit 140 extracts a region where trail specification information is written (specification information region in FIG. 32) from the image region of the trail portion, and recognizes the information written in the extracted region by using character recognition, such as OCR. Then, the trail extracting unit 140 determines whether or not the recognized information is identical to the trail specification information in the acquisition request data (trail specification information in FIG. 12). If the recognized information is identical to the trail specification information, the trail extracting unit 140 outputs the image data to the trail transmitting unit 102, and the trail transmitting unit 102 transmits the image data to the information processing apparatus 4.

In the description given above, the image capture apparatus 6 is a mobile information terminal. The image capture apparatus 6 is not necessarily a mobile information terminal, and may be another type of apparatus as long as the apparatus is capable of acquiring image data, for example, a reading apparatus such as a scanner.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
   a population data storage unit configured to store a population comprising a plurality of transactions conducted in a business process;
   a sample extracting unit configured to sample the population thereby extracting samples from the population, extracted samples corresponding to a subset of the plurality of transactions;
   a trail information memory configured to store information about a trail related to each sample of the extracted samples, the trail corresponding to a document which verifies a fact or details of the extracted samples;
   a trail acquisition instructing unit configured to provide an instruction to acquire the trail for each sample of the extracted samples;
   a trail accepting unit configured to accept the acquired trail; and
   a trail determining unit configured to determine whether the accepted trail is valid or invalid in accordance with the information stored in the trail information memory for each accepted trail,
   wherein, if the trail determining unit determines that the accepted trail is invalid, the trail acquisition instructing unit is configured to provide an instruction to re-acquire a trail related to the sample.

2. The information processing apparatus according to claim 1, further comprising:
   a number-of-samples deciding unit configured to decide a number of samples to be additionally extracted, in accordance with a predetermined reference value for the number of samples, the number of samples which have been extracted by the sample extracting unit, and the number of samples corresponding to trails of which content has been determined to be invalid by the trail determining unit,
   wherein the sample extracting unit is further configured to extract samples the number of which has been decided by the number-of-samples deciding unit, and
   wherein, if the trail determining unit determines that the content of the accepted trail is invalid, the trail acquisition instructing unit is configured to provide an instruction to re-cquire trails for the samples which have been further extracted by the sample extracting unit.

3. The information processing apparatus according to claim 2,
   wherein the trail acquisition instructing unit is configured to provide an instruction to acquire a plurality of trails for one sample, and
   wherein the information processing apparatus further comprises an acquisition stop instructing unit that, if the trail determining unit determines that the content of the accepted trail is invalid, configured to provide an instruction to stop additional acquisition of trails for the sample corresponding to the trail of which content has been determined to be invalid.

4. The information processing apparatus according to claim 2, wherein the sample extracting unit is configured to extract samples so that the total number of extracted samples does not exceed a predetermined upper limit.

5. The information processing apparatus according to claim 1,
wherein the trail acquisition instructing unit is configured to generate information for requesting acquisition of a trail in accordance with the information stored in the trail information memory, and configured to provide the information for requesting the acquisition of the trail in accordance with the information stored in the trail information memory.

6. The information processing apparatus according to claim 1,
wherein, if the trail determining unit determines that a form of the accepted trail is invalid, the trail acquisition instructing unit is configured to provide an instruction to reacquire a trail having a valid form.

7. The information processing apparatus according to claim 1,
wherein the trail acquisition instructing unit is configured to provide an instruction by assigning a person in charge of acquisition to each trail in accordance with information about persons in charge of acquisition.

8. A trail collection system comprising:
an image capture apparatus comprising:
  a trail capture unit configured to capture trails, and
  a trail transmitting unit configured to transmit the trails captured by the trail capture unit; and
an information processing apparatus comprising:
  a population data storage unit configured to store a population comprising a plurality of transaction conducted in a business process;
  a sample extracting unit configured to sample the population thereby extracting samples from the population, extracted samples corresponding to a subset of the plurality of transactions,
  a trail information memory configured to store information about a trail related to a sample of the extracted samples, the trail corresponding to a document which verifies a fact or details of the extracted samples,
  a trail acquisition instructing unit configured to instruct the image capture apparatus to acquire the trail for each sample of the extracted samples,
  a trail accepting unit configured to accept the acquired trail transmitted from the image capture apparatus, and
  a trail determining unit configured to determine whether the accepted trail is valid or invalid in accordance with the information stored in the trail information memory for each accepted trail,
  wherein, if the trail determining unit determines that the accepted trail is invalid, the trail acquisition instructing unit is configured to instruct the image capture apparatus to reacquire a trail related to the sample.

9. The trail collection system according to claim 8,
wherein the image capture apparatus comprises a display configured to display targets to be acquired among a plurality of trails in an acquisition order which is predetermined in accordance with position information about a person in charge of acquisition, in response to a request for acquiring the plurality of trails from the information processing apparatus.

10. The trail collection system according to claim 8,
wherein the image capture apparatus comprises a display configured to display targets to be acquired among a plurality of trails in an acquisition order which is predetermined in accordance with attribute information about trails, in response to a request for acquiring the plurality of trails from the information processing apparatus.

11. The trail collection system according to claim 8,
wherein the trail capture unit is configured to capture a plurality of certain trails,
wherein the image capture apparatus further comprises a trail extracting unit configured to extract, from among the trails captured by the trail capture unit, a trail which has been specified to be acquired by the information processing apparatus, and
wherein the trail transmitting unit is configured to transmit the trail extracted by the trail extracting unit.

12. An information processing method comprising:
providing a population data storage unit configured to store a population comprising a plurality of transactions conducted in a business process;
sampling the population thereby extracting samples from the population, extracted samples corresponding to a subset of the plurality of transactions;
storing information about a trail related to each sample of the extracted samples, the trail corresponding to a document which verifies a fact or details of the extracted samples;
providing an instruction to acquire the trail for the sample of the extracted samples in the extracting;
accepting the accepted trail; and
determining whether the accepted trail is valid or invalid in accordance with the stored information for each accepted trail,
wherein, if the determining determines that the accepted trail is invalid, providing an instruction to re-acquire a trail related to the sample.

13. A non-transitory computer readable medium storing a program causing a computer to execute a process, the process comprising:
providing a population data storage unit configured to store a population comprising a plurality of transactions conducted in a business process;
sampling the population thereby extracting samples from the population, extracted samples corresponding to a subset of the plurality of transaction;
storing information about a trail related to each sample of the extracted samples, the trail corresponding to a document which verifies a fact or details of the extracted. samples;
providing an instruction to acquire the trail for the sample of the extracted samples in the extracting;
accepting the accepted trail; and
determining whether the accepted trail is valid or invalid in accordance with the stored information for each accepted trail,
wherein, if the determining determines that the accepted trail is invalid, providing an instruction to re-acquire a trail related to the sample.

14. The information processing apparatus according to claim 1, wherein the document comprises at least one of an invoice, a receipt, and a statement of delivery.

15. The trail collection system according to claim 8, wherein the document comprises at least one of an invoice, a receipt, and a statement of delivery.

16. The information processing method of claim 12, wherein the document comprises at least one of an invoice, a receipt, and a statement of delivery.

* * * * *